United States Patent
Feijen et al.

(10) Patent No.: US 11,279,052 B2
(45) Date of Patent: *Mar. 22, 2022

(54) BLADE SET, HAIR CUTTING APPLIANCE, AND RELATED MANUFACTURING METHOD

(71) Applicant: KONINKLIJKE PHILIPS N.V., Eindhoven (NL)

(72) Inventors: Fransicus Hermannus Feijen, Leeuwarden (NL); Siegfried Sablatschan, Ferlach (AT); Geert Veenstra, Boornbergum (NL); Wouter Van Kempen, Sappemeer (NL); Jacob Willem Kroon, Leeuwarden (NL); Albert Jan Aitink, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/999,433

(22) Filed: Aug. 21, 2020

(65) Prior Publication Data

US 2020/0376695 A1 Dec. 3, 2020

Related U.S. Application Data

(62) Division of application No. 15/301,428, filed as application No. PCT/EP2015/058486 on Apr. 20, 2015, now Pat. No. 10,751,891.

(30) Foreign Application Priority Data

Apr. 18, 2014 (EP) .................................. 14165283

(51) Int. Cl.
*B26B 19/38* (2006.01)
*B26B 19/06* (2006.01)

(52) U.S. Cl.
CPC .......... *B26B 19/3846* (2013.01); *B26B 19/06* (2013.01); *B26B 19/3893* (2013.01)

(58) Field of Classification Search
CPC ....... B26B 19/02; B26B 19/04; B26B 19/044; B26B 19/046; B26B 19/048; B26B 19/06;
(Continued)

(56) References Cited

U.S. PATENT DOCUMENTS 2,102,529 A 12/1937 Hanley
2,216,797 A 10/1940 Andis
(Continued)

FOREIGN PATENT DOCUMENTS

CN 2145688 11/1993
DE 2455574 7/1975
(Continued)

*Primary Examiner* — Evan H Macfarlane

(57) ABSTRACT

A hair cutting appliance, a blade set for a hair cutting appliance, and to a stationary blade for the blade set. The stationary blade includes a first wall portion arranged to serve as a skin facing wall when in operation, a second wall portion at least partially offset from the first wall portion, such that the first wall portion and the second wall portion define therebetween a guide slot arranged to receive a movable cutter blade in a defined mating manner, and at least one toothed leading edge having a plurality of teeth jointly formed by the first wall portion and the second wall portion. The stationary blade is an integrally formed metal-plastic composite stationary blade. Also discussed is a blade set including an integrated foil shaving region, along with a method for manufacturing a respective blade.

20 Claims, 18 Drawing Sheets

(58) Field of Classification Search
CPC ..... B26B 19/063; B26B 19/066; B26B 19/12; B26B 19/20; B26B 19/205; B26B 19/384; B26B 19/3846; B26B 19/3893; B29C 70/72; B29C 70/78
USPC .............. 30/195, 208, 210, 196, 200, 201, 30/223–225, 43.91, 43.92, 346.5–346.61, 30/350

See application file for complete search history.

(56) References Cited

U.S. PATENT DOCUMENTS

| | | | |
|---|---|---|---|
| 2,222,106 | A | 11/1940 | Knapp |
| 2,290,326 | A | 7/1942 | Hanley |
| 3,279,061 | A | 10/1966 | Andis |
| 4,765,060 | A | 8/1988 | Veselaski |
| 5,084,967 | A | 2/1992 | Nakagawa |
| 5,542,179 | A | 8/1996 | Beutel |
| 10,751,891 | B2 * | 8/2020 | Feijen ................ B26B 19/3893 |
| 2004/0163257 | A1 | 8/2004 | Morisugi |
| 2006/0228472 | A1 | 10/2006 | Van Dyn |
| 2010/0218387 | A1 | 9/2010 | Moons |
| 2011/0094107 | A1 | 4/2011 | Ring |
| 2012/0110859 | A1 | 5/2012 | Kammer |
| 2015/0183118 | A1 | 7/2015 | Roth |
| 2017/0113361 | A1 | 4/2017 | Feijen |

FOREIGN PATENT DOCUMENTS

| | | |
|---|---|---|
| DE | 4410543 | 12/1994 |
| EP | 1894685 | 3/2008 |
| GB | 2425277 | 10/2006 |
| JP | 5492455 | 7/1979 |
| JP | 2003181164 | 7/2003 |
| WO | 2007125491 | 11/2007 |
| WO | 2009149662 | 12/2009 |
| WO | 2013150412 | 10/2013 |

* cited by examiner

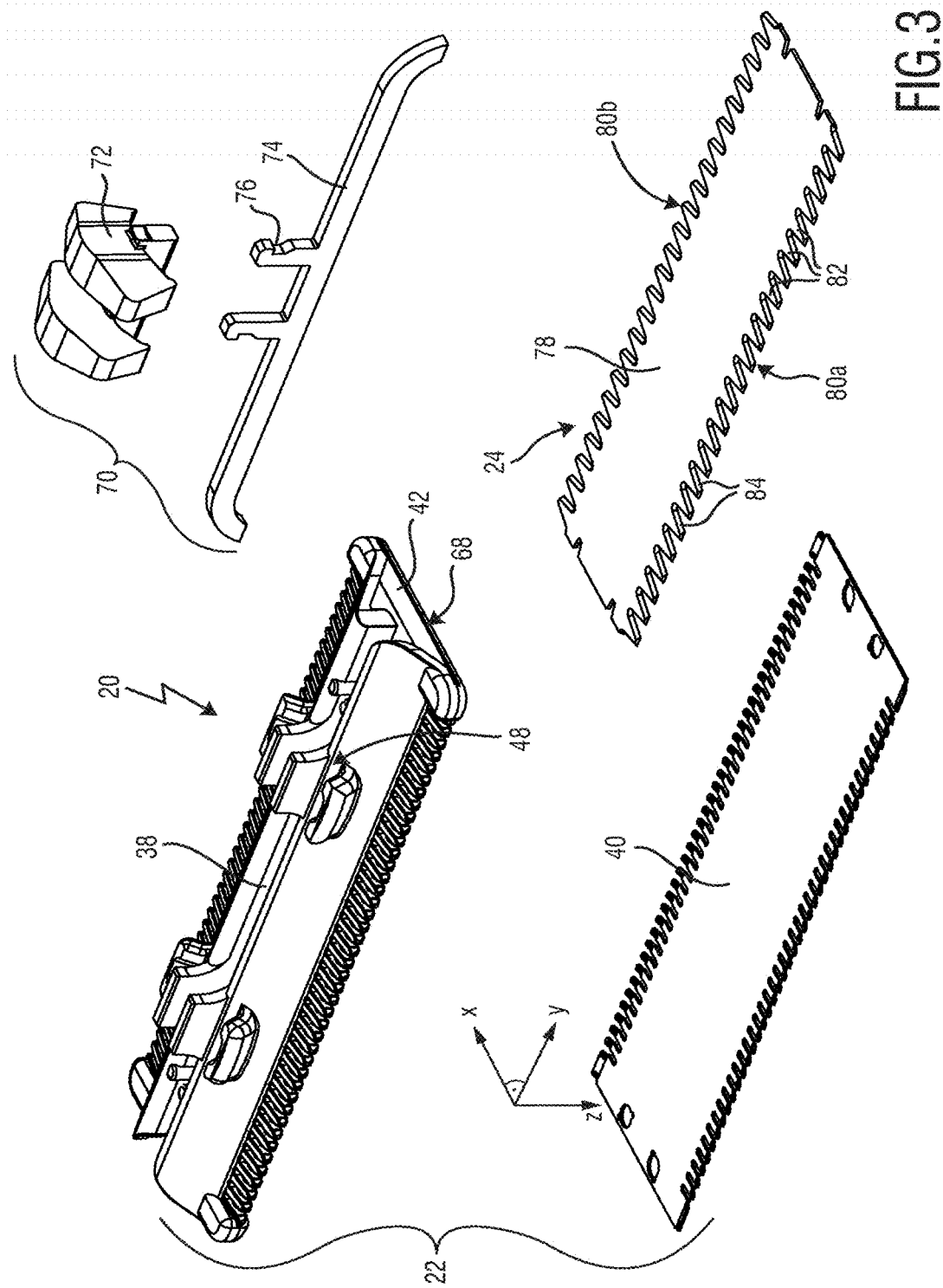

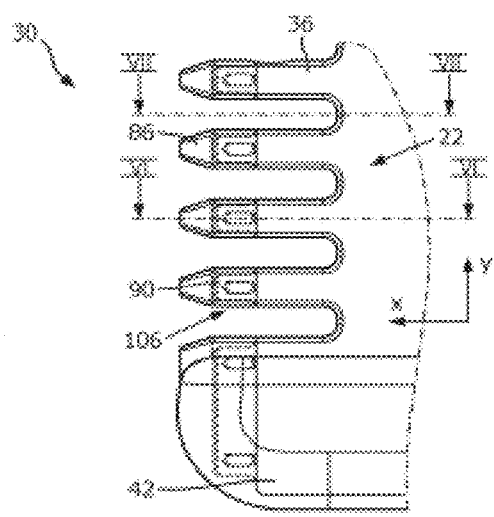

BLADE SET, HAIR CUTTING APPLIANCE, AND RELATED MANUFACTURING METHOD

CROSS-REFERENCE TO RELATED APPLICATION

The present application is a divisional of co-pending U.S. patent application Ser. No. 15/301,428, filed Oct. 3, 2016, which is the U.S. National Phase application under 35 U.S.C. § 371 of International Application No. PCT/EP2015/058486, filed on Apr. 20, 2015 which claims the benefit of European Patent Application Number 14165283.4 filed Apr. 18, 2014. These applications are hereby incorporated by reference herein.

FIELD OF THE INVENTION

The present disclosure relates to a hair cutting appliance, particularly to an electrically operated hair cutting appliance, and more particularly to a stationary blade of blade set for such an appliance. The blade set may be arranged to be moved through hair in a moving direction to cut hair. The stationary blade may be composed of a first wall portion and a second wall portion that define therebetween a guide slot, where a movable cutter blade may be at least partially encompassed and guided. The present disclosure further relates to a method for manufacturing a stationary blade and a blade set for a hair cutting appliance.

BACKGROUND OF THE INVENTION

WO 2013/150412 A1 discloses a hair cutting appliance and a corresponding blade set of a hair cutting appliance. The blade set comprises a stationary blade and a movable blade, wherein the movable blade can be reciprocatingly driven with respect to the stationary blade for cutting hair. The blade set is particularly suited for enabling both trimming and shaving operations.

For the purpose of cutting body hair, there exist basically two customarily distinguished types of electrically powered appliances: the razor, and the hair trimmer or clipper. Generally, the razor is used for shaving, i.e. slicing body hairs at the level of the skin so as to obtain a smooth skin without stubbles. The hair trimmer is typically used to sever the hairs at a chosen distance from the skin, i.e. for cutting the hairs to a desired length. The difference in application is reflected in the different structure and architectures of the cutting blade arrangement implemented on either appliance.

An electric razor typically includes a foil, i.e. an ultra-thin perforated screen, and a cutter blade that is movable along the inside of and with respect to the foil. During use, the outside of the foil is placed and pushed against the skin, such that any hairs that penetrate the foil are cut off by the cutter blade that moves with respect to the inside thereof, and fall into hollow hair collection portions inside the razor.

An electric hair trimmer, on the other hand, typically includes generally two cutter blades having a toothed edge, one placed on top of the other such that the respective toothed edges overlap. In operation, the cutter blades reciprocate relative to each other, cutting off any hairs that are trapped between their teeth in a scissor action. The precise level above the skin at which the hairs are cut off is normally determined by means of an additional attachable part, called a (spacer) guard or comb.

Furthermore, combined devices are known that are basically adapted to both shaving and trimming purposes. However, these devices merely include two separate and distinct cutting sections, namely a shaving section comprising a setup that matches the concept of powered razors as set out above, and a trimming section comprising a setup that, on the other hand, matches the concept of hair trimmers.

Common electric razors are not particularly suited for cutting hair to a desired variable length above the skin, i.e., for precise trimming operations. This can be explained, at least in part, by the fact that they do not include mechanisms for spacing the foil and, consequently, the cutter blade from the skin. But even if they did, e.g. by adding attachment spacer parts, such as spacing combs, the configuration of the foil, which typically involves a large number of small perforations, would diminish the efficient capture of all but the shortest and stiffest of hairs.

Similarly, common hair trimmers are not particularly suited for shaving, primarily because the separate cutter blades require a certain rigidity, and therefore thickness, to perform the scissor action without deforming. It is the minimum required blade thickness of a skin-facing blade thereof that prevents hair from being cut off close to the skin. Consequently, a user desiring to both shave and trim his/her body hair may need to purchase and apply two separate appliances.

Furthermore, combined shaving and trimming devices show several drawbacks since they basically require two cutting blade sets and respective drive mechanisms. Consequently, these devices are heavier and more susceptible to wear than standard type single-purpose hair cutting appliances, and also require costly manufacturing and assembling processes. Similarly, operating these combined devices is often experienced to be rather uncomfortable and complex. Even in case a conventional combined shaving and trimming device comprising two separate cutting sections is utilized, handling the device and switching between different operation modes may be considered as being time-consuming and not very user-friendly. Since the cutting sections are typically provided at different locations of the device, guidance accuracy (and therefore also cutting accuracy) may be reduced, as the user needs to get used to two distinct dominant holding positions during operation.

The above WO 2013/150412 A1 tackles some of these issues by providing a blade set comprising a stationary blade that houses the movable blade such that a first portion of the stationary blade is arranged at the side of the movable blade facing the skin, when used for shaving, and that a second portion of the stationary blade is arranged at the side of the movable blade facing away from the skin when in use. Furthermore, at a toothed cutting edge, the first portion and the second portion of the stationary blade are connected, thereby forming a plurality of stationary teeth that cover respective teeth of the movable blade. Consequently, the movable blade is guarded by the stationary blade.

This arrangement is advantageous insofar as the stationary blade may provide the blade set with increased strength and stiffness since the stationary blade is also present at the side of the movable blade facing away from the skin. This may generally enable a reduction of the thickness of the first portion of the stationary blade at the skin-facing side of the movable blade. Consequently, since in this way the movable blade may come closer to the skin during operation, the above blade set is well-suited for hair shaving operations. Aside from that, the blade set is also particularly suited for hair trimming operations since the configuration of the cutting edge, including respective teeth alternating with slots, also allows longer hairs to enter the slots and, consequently, to be cut by the relative cutting motion between the movable blade and the stationary blade.

However, there is still a need for improvement in hair cutting devices and respective blade sets. This may particularly involve user comfort related aspects, performance related aspects, and manufacturing related aspects. Manufacturing related aspects may involve suitability for series production or mass production.

SUMMARY OF THE INVENTION

It is an object of the present disclosure to provide an alternative stationary cutter blade, and a corresponding blade set that enables both shaving and trimming. Particularly, a stationary blade and a blade set may be provided that may contribute to a pleasant user experience in both shaving and trimming operations. More preferably, the present disclosure may address at least some drawbacks inherent in known prior art hair cutting blades, as discussed above, for instance. It would be further advantageous to provide a blade set that may exhibit an improved operating performance while preferably reducing the time required for cutting operations. It is further preferred to provide a corresponding method for manufacturing such a stationary blade. It is particularly desired to present a manufacturing method that may permit the production of blade sets and particularly of stationary blades in a cost-efficient manner and with appropriate process capability.

In a first aspect of the present invention a stationary blade for a blade set of a hair cutting appliance is presented, said blade set being arranged to be moved through hair in a moving direction to cut hair, said stationary blade comprising:

a first wall portion arranged to serve as a skin facing wall when in operation, a second wall portion at least partially offset from the first wall portion, such that the first wall portion and the second wall portion define therebetween a guide slot arranged to receive a movable cutter blade, at least one toothed leading edge comprising a plurality of teeth jointly formed by the first wall portion and the second wall portion, wherein the stationary blade is an integrally formed metal-plastic composite stationary blade, wherein the first wall portion is at least partially made from metal material, wherein the second wall portion is at least partially made from plastic material, and wherein the first wall portion and the second wall portion are arranged to receive the movable cutter blade in the guide slot in a defined mating manner.

This aspect is based on the insight that the stationary blade may be configured to house the movable cutter blade in a predefined manner. Particularly, the movable cutter blade may be directly received at the stationary blade, i.e. without the need to mount additional biasing or spring elements in the guide slot. More particularly, the movable cutter blade may be slidably received in the guide slot. By contrast, conventional blade set arrangements typically include additional biasing elements, such as spring elements, that urge the movable blade into close contact with the stationary blade.

Defined mating of the movable blade in the guide slot may comprise a defined clearance fit, a transition fit and an interference fit. The defined mating may be achieved by providing a defined clearance and considerably tight tolerances at the guide slot.

The first wall portion which may be in close contact with the skin, and which is basically configured to cooperate with a movable cutter blade to cut hair, preferably comprises considerable stiffness and robustness properties. The first wall portion may be at least partially made from metal material, particularly from steel material such as stainless steel, for instance. Consequently, even though the first wall portion preferably may have a small thickness so as to allow cutting hairs close to the skin, it may provide adequate strength. Furthermore, the second wall portion may be added at the side typically facing away from the skin to further strengthen the stationary blade. The first wall portion and the second wall portion may cooperate to form the guide slot.

Preferably, the stationary blade may be obtained from a combined manufacturing process which involves forming the plastic material and bonding the plastic material to the metal material, basically at the same time. It is particularly preferred that the stationary blade consists of the first wall portion and the second wall portion, i.e. no further essential components need to be mounted thereto to accomplish the stationary blade. Generally, the stationary blade may be regarded as a two-component part wherein the two components are integrally and fixedly interconnected.

In one embodiment, the first wall portion and the second wall portion are configured to receive the movable cutter blade directly therebetween, particularly without an additional biasing element. Consequently, manufacturing costs and assembly costs may be reduced.

In one embodiment, the stationary blade further comprises a metal component, particularly a sheet metal insert, and a plastic component bonded to the metal component, wherein at least a central portion of the first wall portion is formed by the metal component. This may have the advantage that the metal component may be particularly thin-walled which may allow cutting hairs very close to the skin of a user. Consequently, shaving performance may be improved.

In one embodiment, the first wall portion and the second wall portion enable a defined clearance fit mating of the movable cutter blade in the guide slot of the stationary blade, and wherein a vertical clearance height dimension $l_{cl}$ of the guide slot is preferably larger than an expected vertical thickness dimension $l_t$ of a to-be-mounted movable cutter blade. Hence, a defined clearance fit for the movable cutter blade may be provided.

In one embodiment, the first wall portion and the second wall portion enable a defined pre-stressed fit mating of the movable cutter blade in the guide slot of the stationary blade, and wherein a vertical clearance height dimension $l_{cl}$ of the guide slot is preferably smaller than an expected vertical thickness dimension $l_t$ of a to-be-mounted movable cutter blade. Hence, a defined interference fit or, at least, a defined transition fit for the movable cutter blade may be provided.

In one embodiment, the second wall portion comprises at least one protruding contact portion facing the first wall portion, particularly at least one laterally extending contact ridge, wherein the at least one protruding contact portion is configured to contact a bottom surface of the movable cutter blade. The bottom surface may also be referred to as a rear surface. The at least one protruding contact portion may inwardly protrude from the second wall portion towards to the first wall portion. A resulting gap between the at least one protruding contact portion and the first wall portion, particularly a surface thereof facing away from the skin, may define the vertical clearance height dimension $l_{cl}$. The term laterally extending shall not be construed in limiting sense as requiring a protruding contact portion that laterally extends in a continuous fashion.

In one embodiment, the at least one protruding contact portion is configured to urge the movable cutter blade against the first wall portion in a mounted state. Consequently, the stationary blade as such may act as a biasing element that ensures the mating condition of the movable cutter blade.

In one embodiment, the teeth of the at least one toothed leading edge comprise, when viewed in a cross-sectional plane perpendicular to a lateral direction Y, a substantially U-shaped form comprising a first leg at the first wall portion and a second leg at the second wall portion, wherein the first leg and the second leg merge into one another at tooth tips, and wherein the second wall portion comprises an inclined portion adjacent to the second leg, wherein the at least one protruding contact element is preferably arranged at a transition between the second leg and the inclined portion. Between the first leg and the second leg, a defined mounting gap or slot for the movable cutter blade may be provided, particularly for the teeth thereof. This may further enhance cutting performance.

In one embodiment, the first wall portion is a basically rigid wall portion, wherein the second wall portion is a basically flexible wall portion, wherein at least a central portion of the first wall portion is made from a material with a modulus of elasticity that is greater than a modulus of elasticity of a material of which at least a central portion of the second wall portion is made. Basically, the second wall portion may be significantly thicker than the first wall portion which may provide also the second wall portion with considerable strength properties. Consequently, the blade set as such may be stiffened.

In one embodiment, the stationary blade, particularly the plastic component thereof, exhibits residual stresses, particularly residual flexural stresses that are attributable to injection molding-related distortion, and wherein, as a result of the distortion, the at least one leading edge is bended with respect to a central portion. Particularly, the at least one leading edge may be rearwardly bended when viewed in a cross-sectional plane perpendicular to the lateral direction Y, such that the resulting vertical clearance height dimension $l_{cl}$ is reduced. Generally, as a result of the distortion of the plastic component, the stationary blade may be flexed, particularly convexly curved when viewed in the cross-sectional plane perpendicular to the lateral direction Y. This may involve that the stationary blade at least partially acts like a flat spring or laminated spring element which may apply biasing forces to the movable blade.

In one embodiment, the stationary blade further comprises a gap portion formed at the guide slot in the vicinity of the at least one toothed leading edge, wherein the gap portion comprises at least one of a bottom gap at the second wall portion and a frontal gap at a transition between the first wall portion and the second wall portion, wherein the gap portion is an at least partially concavely shaped internal indentation, wherein the gap portion is arranged to provide a remaining gap $l_{vg}$, $l_{fg}$ between the guide slot and a toothed leading edge of a movable cutter blade received therein. Preferably, the gap portion is adapted to accommodate hairs, particularly cut hair sections. In other words, the gap portion may be adapted to an expected dimension, e.g. an expected diameter, of cut hairs. The gap portion may be formed at the guide slot adjacent to the protruding contact portion. The stationary blade may comprise a first gap portion and a second gap portion associated with respective toothed leading edges.

This may have the advantage that hairs, particularly cut hairs, may be allowed to enter the gap portion between the second wall portion and the movable cutter blade. As further set out herein, it may not be unlikely that cut hairs might tend to enter and block a gap between the movable cutter blade and the second wall portion, if the gap is too small to accommodate hairs without generating considerable (frictional) forces between the guide slot and the movable cutter blade. Although generally a major portion of cut hairs may be ejected from the guide slot without entering the gap, it may not be unlikely that some hairs may be pulled into and, consequently, stuck in the gap which may impair the cutting performance. This may increase power consumption and frictional heat generation of the blade set. Generally, reduced cutting speed (e.g. reduced rotational speed of the motor) may be experienced by the user as a loss of power and may be therefore regarded as quality impairment.

This issue may be addressed, on the one hand, by minimizing the gap between the movable cutter blade and the guide slot of the stationary blade. However, this approach may require manufacturing the components of the blade set with high precision which may further increase manufacturing costs. On the other hand, this issue may be addressed in accordance with the above embodiment by providing a defined increased gap providing sufficient clearance to accommodate hairs without generating significant frictional forces when the movable cutter blade is actuated with respect to the stationary blade. It may be therefore preferred that that gap portion is arranged to receive a plurality of hairs. In the course of the cutting action, sooner or later the hairs may be led out of the gap without significantly impairing the cutting performance.

The gap portion may be arranged between the first wall portion and the movable cutter blade. Consequently, the gap portion may comprise a bottom gap or rear gap. The bottom gap or rear gap may define a vertical gap having a vertical gap extension or height gap extension $l_{vg}$. However, the gap portion may be further arranged between the tips of the teeth of the stationary blade and the tips of the teeth of the movable cutter blade. Consequently, the gap portion may comprise a frontal gap or nose gap. The frontal gap or nose gap may define a longitudinal gap having a longitudinal gap extension $l_{fg}$. In some embodiments, the vertical gap extension $l_{vg}$ and the longitudinal gap extension $l_{fg}$, if any, may be in the range between about 50 to about 250 µm (micrometer), preferably in the range between about 100 µm to about 200 µm, more preferably in the range between about 120 µm to about 180 µm.

Generally, the gap portion may be arranged as a curved internal indentation at the guide slot. The curved indentation may comprise an inclined flank adjacent to and extending from the protruding contact portion. The inclined flank may merge into a curved transition adjacent to the tips of the teeth of the movable cutter blade. In some embodiments, the curved transition may span from the second wall portion to the first wall portion, thereby forming the frontal (nose) gap. In some embodiments, the curved transition may end at the second wall portion without extending to the first wall portion. Consequently, in these embodiments, the curved transition does not necessarily define a frontal nose gap.

In one embodiment, the second wall portion may comprise a protruding bulged portion or bulge opposite to the gap portion. Since the gap portion may be a recessed gap portion that basically weakens the second wall portion, it may be preferred that material is added to the opposite side of the second wall portion. The protruding bulge may be arranged as an at least partial offset of the gap portion. Consequently, the wall thickness of the second wall portion also may be maintained at the gap portion, at least substantially.

The present disclosure further relates to an embodiment of a stationary blade which may be regarded as a beneficial exemplary refinement of any of the above-described embodiments and refinements in connection with the first aspect of the stationary blade according to the present disclosure. However, this shall not be construed in a limiting sense. Consequently, the following embodiments and refinements in the alternative also may form part of a separate aspect of the present disclosure or, at least in some respect, of a separate, distinct invention that may be claimed independently.

In accordance with the respective embodiment, the stationary blade further comprises a perforated section in which a plurality of perforations is provided, preferably a perforated section that is arranged in a central portion between a first toothed leading edge and a second toothed leading edge, wherein the perforations at least partially comprise cutting edges at the side of the first wall portion that is facing away from the skin.

The above embodiment may be therefore implemented in isolation in a stationary blade for a blade set of a hair cutting appliance, said blade set being arranged to be moved through hair in a moving direction to cut hair, said stationary blade comprising:

a first wall portion arranged to serve as a skin facing wall when in operation, a second wall portion at least partially offset from the first wall portion, such that at the first wall portion and a second wall portion define therebetween a guide slot arranged to receive a movable cutter blade, at least one toothed leading edge comprising a plurality of teeth jointly formed by the first wall portion and the second wall portion, wherein the first wall portion and the second wall portion are arranged to receive the movable cutter blade in the guide slot in a defined mating manner.

Therefore, regardless of whether the embodiment including the perforations in the perforated region is actually implemented in the context of the main aspect of the present disclosure or in isolation, the stationary blade's capability to shave hair very close to the skin, particularly the shaving capability may be even further increased. In other words, since at least one toothed leading edge jointly defined by the first wall portion and the second wall portion is provided and since, in addition, a perforated region including a plurality of perforations is provided, also considerably short and therefore stiff hairs can be cut or chopped in the perforated region when the stationary blade cooperates with a correspondingly shaped movable cutter blade. In other words, the perforated region is not particularly suited for trimming or shaving longer hairs since longer hairs actually may hardly enter the respective perforations of the perforated region. However, as already emphasized further above, since the stationary blade is particularly suited for hair cutting appliances which may be referred to as double-purpose hair cutting appliances which are adequately suitable for both trimming and shaving, the total performance of the hair cutting appliance may be even further enhanced.

Preferably, a considerably simple arrangement comprising only a single stationary blade and a single integrally shaped movable cutter blade may provide, at respective longitudinal ends thereof, at least one toothed leading edge, particularly a first toothed leading edge and a second toothed leading edge that are offset from each other in the longitudinal direction. Consequently, a first hair cutting region may be provided which is arranged for trimming and shaving processes. In addition, a second hair cutting region may be provided which is separate from the first cutting region but which may be arranged adjacent to the first cutting region.

While it is acknowledged in this connection that conventional hair trimming apparatuses are known which implement a first cutting zone and a second cutting zone, it is emphasized that these hair cutting appliances generally require more than just two components to define the first cutting region and the second cutting region. In other words, since in both the first cutting region and the second cutting region typically at least two respective components cooperate to cut hair, respective prior art hair trimming appliances may for instance require four respective components, two of which may be referred to as stationary or guard blades and two further ones of which may be regarded as movable cutter blades. For instance, these prior art devices may implement a conventional foil shaving arrangement and a conventional hair trimming arrangement, each of which is defined by two respective cooperating parts. An exemplary example for such a device is for instance disclosed in DE 44 10 543 C1.

In a further embodiment of the above alternative aspect, the stationary blade is arranged to receive a movable cutter blade that comprises a corresponding perforated section so as to jointly define an integrated foil shaving region, wherein the cutting edges of the perforations of the first wall portion are arranged to cooperate with corresponding cutting edges that are provided at the movable cutter blade in a shearing action upon relative motion between the stationary blade and the movable cutter blade. As a consequence, the overall appearance of a blade set that is fitted with a respective stationary blade and a respective cutter blade may resemble a conventional cutting head for a conventional combined shaving and trimming hair cutting appliance as disclosed in DE 44 10 543 C1. However, in contrast to respective prior art devices, a blade set in accordance with the present disclosure merely requires, at least in some embodiments, two cooperating components, namely the stationary blade and the movable cutter blade, each of which is, on the one hand, provided with cutter teeth and, on the other hand, with respective shaving perforations.

As used herein, the integrated foil shaving region may be jointly defined by the metal component of the stationary blade that form a substantial part of the first wall portion, and by the movable cutter blade. Consequently, the term integrated foil shaving region shall not be construed in a limiting sense as a necessarily requiring a (very thin) shearing foil on the side of the stationary blade. Rather, the first wall portion and/or the metal component thereof may be arranged in a sufficiently stiff (and therefore thick) fashion so as to define considerably stiff teeth at the toothed leading edge. Preferably, the thickness or height of the metal component is the same at both the toothed leading edge and the perforated region.

In a further refinement of this aspect, the perforated section of the first wall portion comprises a pattern of perforations that are arranged as circular walls. Generally, a width or, more explicitly, a (lateral) diameter of the perforations may be adapted to a (lateral) slot width of the slots that are formed between respective teeth of the laterally extending toothed leading edges at the stationary blade. Generally, the perforations may comprise a shape that is selected from the group consisting of honeycomb hole, circular hole, longitudinally extending slot, slanting slot and combinations thereof. It is worth mentioning in this connection that the cutting action or cutting motion at the at least one toothed leading edge and at the perforated sections that may form the foil shaving region may be basically the same since on the side of the stationary element and on the side of the movable element basically only one respective component is provided. Therefore, also at the level of the co-operating perforated sections, primarily a lateral cutting motion, particularly a reciprocating lateral cutting motion may be present.

In a further aspect of the present invention a blade set for a hair cutting appliance is presented, said blade set being arranged to be moved through hair in a moving direction to cut hair, said blade set comprising:

a stationary blade in accordance with at least some aspects of the present disclosure, and a movable cutter blade comprising at least one toothed leading edge, said movable cutter blade being movably arranged within the guide slot defined by the stationary blade, such that, upon relative motion of the movable cutter blade with respect to the stationary blade, the at least one toothed leading edge of the movable cutter blade cooperates with corresponding teeth of the stationary blade to enable cutting of hair caught therebetween in a cutting action.

It is particularly preferred that the blade set consists of the stationary blade and the movable cutter blade. This may involve a driving force transmitting member for the movable cutter blade. However, it is particularly preferred that the movable cutter blade is arranged in the guide slot without being biased by a separate biasing member, such as a biasing spring element. It is further preferred that further mounting elements or fastening element for the movable blade can be omitted. Consequently, it is preferred that a top side of the movable cutter blade is in contact with the first wall portion and that a bottom side (or rear side) of the movable cutter blade is in contact with the second wall portion.

It goes without saying that the movable cutter blade may be arranged in the guide slot with a certain clearance or fit with respect to the first wall portion and the second wall portion, respectively, since the movable cutter blade is preferably slidably arranged at the guide slot. As used herein, relative motion may involve reciprocating motion of the movable cutter blade with respect to the stationary blade. In some embodiments, relative motion may involve rotation of the movable blade with respect to the cutter blade.

In one embodiment of the blade set, the movable cutter blade directly contacts, at a skin-facing side thereof, the first wall portion and, at a side facing away from the skin, the second wall portion, particularly at the at least one protruding contact portion.

In one embodiment of the blade set, the stationary blade is, when viewed in a cross-sectional plane perpendicular to a lateral direction Y, at least partially rearwardly bended such that the movable cutter blade sectionally contacts the first wall portion and the second wall portion, wherein a contact area between the movable cutter blade and the first wall portion is longitudinally offset from a contact area between the movable cutter blade and the second wall portion. Preferably, the stationary blade is arched or arc-shaped. The desired deformation may be a result of the mold-related distortion of the plastic component of the stationary blade. Preferably, two respective sets of contact surfaces are provided at oppositely arranged toothed leading edges of the stationary blade. Preferably, the contact surfaces are relatively small with respect to an overall surface of the movable cutter blade. The contact surfaces may involve relatively narrow line contact surfaces. The stationary blade may comprise a basically convex shape, viewed in a top view. Thus, the stationary blade may act as a spring, particularly a flat spring element. The movable cutter blade may be arranged without considerable play in the guide slot. The movable cutter blade may be slightly preloaded as a result of the deformation of the stationary blade.

In one embodiment of the blade set, the movable cutter blade is frontwardly bended when viewed in a cross-sectional plane perpendicular to the lateral direction Y, such that the movable cutter blade is received in the guide slot in a vertically preloaded and slightly flexed fashion. Consequently, viewed in a top view, the movable cutter blade may comprise a basically concave shape. Thus, also the movable cutter blade may act as a spring, particularly a flat spring element. The movable cutter blade may be arranged without considerable play in the guide slot. The movable cutter blade may be slightly preloaded. It goes without saying that the above embodiments with respect to the induced deformations of the stationary blade and the movable cutter blade also may be combined.

In one embodiment of the blade set, the movable cutter blade comprises, at the at least one toothed leading edge thereof, top cutting edges that are configured to cooperate with cutting edges at the first wall portion, and bottom cutting edges that are configured to cooperate with bottom cutting edges at the second wall portion.

This may have the advantage that hairs, particularly cut hairs, may be prevented from entering a gap between the second wall portion and the movable cutter blade. It may not be unlikely that a small gap is provided at the bottom side to the movable cutter blade in the area of the toothed leading edge since the movable cutter blade is basically urged against the first wall portion and may be therefore at least sectionally lifted from the second wall portion. Hairs may be stuck in the gap so that debris may be generated at the gap. Hence, the blade set may become stalled. By providing the blade set with the ability to cut hairs at the top side and the bottom side of the movable blade the amount of stuck hairs can be greatly reduced. It is worth mentioning in this regard that even though the bottom cutting edges at the second wall portion may be formed by the plastic component, the stationary blade and the movable cutter blade may generate considerable shear forces and, as a result, cut hairs at the bottom side of the movable cutter blade.

As with the alternative embodiment of the stationary blade as discussed hereinbefore, also the blade set may be refined by the addition of perforated sections at the blade set end and at the movable cutter blade so as to form an integrated foil shaving region. Consequently, in a further embodiment of the blade set as discussed hereinbefore, which may be regarded as a beneficial refinement and, in addition, as a separate aspect of the present disclosure which may in the alternative form also part of a separate invention, the movable cutter blade comprises a perforated section that is adapted to a perforated section of the stationary blade, wherein a plurality of perforations is provided at the perforated section, and wherein the perforations of the movable cutter blade at least partially comprise cutting edges at the skin-facing side of the movable cutter blade.

As indicated above, the design of the blade set, particularly the design of the stationary blade thereof, provides for a mounting of the movable cutter blade in the guide slot that is defined at the stationary blade in a defined mating manner. Therefore, one can make profit of the respective tight clearance fit mating. Preferably, the skin-facing side of the movable cutter blade and the side of the first wall portion of the stationary blade that is facing away from the skin are in close contact, particularly in close surface contact. This, on the one hand, applies to the toothed cutting edges, where respective teeth of the movable cutter blade and the stationary blade may co-operate to cut or trim hair. On the other hand, this may also apply to the respective perforated sections that are preferably arranged in a central region between the respective teeth that are formed at longitudinal ends of the blades. Therefore, with little additional efforts, the shaving capability of the blade set may be significantly improved. Further, in a respective hair trimming mode where typically longer hairs are cut at a defined distance from the level of the skin, the perforated sections do not impair or jeopardize the hair trimming performance.

In other words, a main advantage of the alternative aspect of the blade set that is provided with a first type of cutting region and a second type of cutting region is that the foil-type cutting region that is arranged at a center portion of the skin-facing side may improve the shaving capability, whereas the at least one toothed leading edge, preferably the first and the second toothed leading edge that are arranged at laterally extending longitudinal ends of the blade set may improve the blade sees capability for trimming operations. Generally, hair trimming may require a sufficient visibility of the to-be-processed hair or beard portion. By contrast, shaving generally does not require a considerable visibility of the to-be-processed skin portion. Therefore, the central portion of the blade set may be advantageously used for the foil shaving region.

Inherent material characteristics of the plastic component may be utilized so as to provide an internal or inherent suspension which urges the metal component in the desired way into close contact with the movable cutter blade. By way of example, given a cross-sectional lateral side view of the blade set, a defined line contact between cutting or contact surfaces of the movable cutter blade and the metal component that forms a substantial portion of the first wall portion is desirable. Preferably, in respective zones or areas (i.e. at the at least one toothed leading edge and at the foil shaving region), a defined level of contact force between the movable cutter blade and the metal component can be achieved. In areas of the first wall portion and the movable cutter blade where actually no cutting edge is provided, a respective contact force may be smaller.

Generally, as the movable cutter blade and the first wall portion, particularly the metal component thereof, are moved with respect to each other to enable the cutting action, heat is generated as the movable cutter blade slides with respect to the stationary blade. So as to reduce the level of generated heat, it may be preferred in at least some embodiments to further process at least one of the movable cutter blade or the metal component for the first wall portion. A respective processing may involve material-removing processing. To this end, for instance etching or a similar electro-chemical-machining (ECM) method may be utilized. By way of example, at least one of the contact surfaces of the movable cutter blade and the metal component that are facing each other may be processed so as to remove material in regions thereof that are not required for the cutting operation. In other words, the movable cutter blade and/or the metal component for the first wall portion may be at least partially or sectionally thinned in regions where no cutting edge (or corresponding tooth or perforation) is provided. Consequently, an even better contact at the cutting edges may be achieved. Further, since an effective contact surface or area may be reduced in this way, the level of heat generation may be decreased.

A further benefit of the foil shaving region may be that the sliding capability of the blade set, particularly the skin-facing top surface thereof at the surface of the skin may be improved. In some applications, particularly when shaving relatively stubbly skin portions, remaining stubbles that cannot be caught and removed at the toothed leading edges may impair a sliding movement of the blade set along the skin. Therefore, it may be beneficial to provide a respective foil shaving region so as to enable respective shaving operations in the central portion of the top surface of the blade set so as to smoothen the skin.

In a further refinement of the perforated movable cutter blade of the blade set, in the mounted state, an areal surface contact is provided between the perforated section of the movable cutter blade and the perforated section of the stationary blade. Consequently, hairs may be prevented from entering a respective gap between the stationary blade and the movable cutter blade which might have a negative impact on the cutting performance and on the user's experience. As used herein, an areal surface contact may be referred to as a sufficiently large contact area between the movable cutter blade and the stationary blade at their perforated sections. In other words, as used herein, an areal surface contact is not just a spot contact or a line contact but rather a surface contact that defines a sufficiently large contact surface between the contacting blades. Further, it is preferred that the surface contact is also maintained in the course of the cutting operations when the stationary blade and the movable cutter blade are moved with respect to each other.

In accordance with another embodiment of the blade set, when viewed in a cross-sectional plane perpendicular to the lateral direction, the first wall portion and the movable cutter blade are convexly curved, wherein the first wall portion and the movable cutter blade are, in an unbiased state, differently curved. This embodiment is based on the insight that the desired surface contact between the movable cutter blade and the first wall portion of the stationary blade may be achieved by deliberately shaping the components in an uneven or unplanar fashion and to bias the components in the mounted state in a defined manner such that the movable cutter blade and the first wall portion come into close surface contact. It may be beneficial to provide for differently curved geometries at the first wall portion and the movable cutter blade since in this way the desired contact state may be reliably achieved by applying a respective biasing force as already indicated above. As already explained hereinbefore, at least a substantial portion of the first wall portion of the stationary blade is formed by the metal component, particularly a respective metal sheet. Therefore, at the level of the stationary blade, the desired curved shape in the unbiased state is preferably provided at the metal component.

In yet another refinement of the perforations-containing embodiment of the blade set, in the unbiased state, the curvature of the first wall portion, particularly of the metal component, is different from a curvature of the movable cutter blade, wherein, in the mounted state, the movable cutter blade and the first wall portion are biased against each other such that the movable cutter blade and the first wall portion contact each other in an areal fashion. The different curvatures may be present at least partially along the respective longitudinal extension of the movable cutter blade and of the metal component that forms a substantial portion of the first wall portion. Preferably, a respective radius of curvature that is present at the first wall portion is different from the radius of curvature at the movable cutter blade. In some embodiments, the unbiased state referred-to herein may be regarded as an imaginary unbiased state as the movable cutter blade and particularly the first wall portion or, more particularly, the metal component do not necessarily have to be present in isolation in the described and defined shape in the course of the manufacturing process. Hence, in some embodiment, the unbiased state may be regarded as an imaginary state that would be present in case the already-mounted or already-molded components would be separated from each other.

Preferably, both the first wall portion and the movable cutter blade are convexly shaped. Hence, in case a radius of curvature of the movable cutter blade is smaller than a radius of curvature of the metal component that forms the first wall portion, in the unbiased state a line contact in the central regions, particularly the perforated sections of the components would be enabled. As a consequence, for instance respective longitudinal ends of the movable cutter blade have to be urged or biased against the corresponding longitudinal ends of the metal component so as to enlarge the contact area. In case the radius of curvature of the movable cutter blade is greater than the radius of curvature of the metal component, in the biased state basically two line contacts between the components would be enabled at the respective longitudinal ends thereof, particularly adjacent to or at the respective teeth. Consequently, in the mounted state, the central portion of the movable cutter blade should be biased or urged against the corresponding portion of the metal component so as to achieve the desired contact surface.

In a further aspect of the present invention a method of manufacturing a metal-plastic composite stationary blade of a blade set for a hair cutting appliance is presented, the method comprising the following steps:

providing a metal component, particularly a sheet metal component, at least substantially forming a central portion of a first wall portion, providing a mold, particularly an injection mold, the mold defining a shape of a plastic component, arranging the metal component in the mold, providing a substitute component in the mold, the substitute component being configured to keep clear a to-be-formed guide slot of the stationary blade when molding, wherein the substitute component is adapted to an expected vertical thickness dimension $l_t$ of a to-be-mounted movable cutter blade, forming, particularly injection molding, the plastic component, wherein the plastic component and the metal component define a first wall portion and a second wall portion of the stationary blade, the first wall portion being arranged to serve as a skin facing wall when in operation, the second wall portion being at least partially offset from the first wall portion, such that the first wall portion and the second wall portion define therebetween the guide slot for the movable cutter blade, wherein the first wall portion and the second wall portion jointly form at least one toothed leading edge comprising a plurality of teeth, and wherein the first wall portion and the second wall portion enable a defined mating of the movable cutter blade in the guide slot of the stationary blade, removing the substitute component from the metal-plastic composite stationary blade.

The substitute component may be arranged as a slide of the mold for the stationary blade. In the alternative, the substitute component may be formed as a separate component that may be inserted into the mold and removed with the stationary blade from the mold after molding. Generally, the substitute component may be arranged as a reusable substitute component. However, in some embodiments, the substitute component may be arranged as a non-reusable substitute component which may also be referred to as lost core.

In one embodiment of the method, the step of forming the plastic component comprises inducing distortion-related residual stresses in the stationary blade, particularly in the plastic component thereof, wherein the stationary blade is, when viewed in a cross-sectional plane perpendicular to a lateral direction Y, at least partially rearwardly bended after cooling down such that the movable cutter blade sectionally contacts the first wall portion and the second wall portion.

In one embodiment of the method, the step of providing the substitute component in the mold comprises at least one of the following steps:

providing at least one lateral slide in the mold that defines the guide slot for the movable cutter blade, and arranging a separate replacement dummy component in the mold, particularly a reusable dummy component, wherein the dummy component is removed from the metal-plastic composite stationary blade outside the mold.

In a further embodiment of the manufacturing method there is provided the step of processing the metal component including forming a perforated section comprising a plurality of perforations at a central region of the metal component so as to define a foil shaving region.

In a further aspect of the present invention a method of manufacturing a blade set for a hair cutting appliance is presented, the method comprising the following steps:

manufacturing a stationary blade according to at least some aspects of the stationary blade manufacturing method in accordance with the present disclosure, providing a movable cutter blade comprising at least one toothed leading edge arranged to cooperate with at least one respective toothed leading edge of the stationary blade, and inserting the movable cutter blade into the guide slot of the stationary blade, particularly passing the movable cutter blade through a lateral opening of the stationary blade.

In a further step, which may be carried out upstream to the step of providing the movable cutter blade, the movable cutter blade may be manufactured. This may involve processing the movable cutter blade including forming a perforated section comprising a plurality of perforations at a central region of the movable cutter blade so as to define, in cooperation with the stationary blade, a foil shaving region.

Preferred embodiments of the invention are defined in the dependent claims. It shall be understood that the claimed method has similar and/or identical preferred embodiments as the claimed device and as defined in the dependent claims.

BRIEF DESCRIPTION OF THE DRAWINGS

These and other aspects of the invention will be apparent from and elucidated with reference to the embodiments described hereinafter. In the following drawings

FIG. 3 is an exploded perspective bottom view of the blade set shown in FIG. 2;

FIG. 4 is a partial top view of a stationary blade of the blade set shown in FIG. 2, wherein hidden edges of the stationary blade are shown for illustrated purposes;

FIG. 5 is a partial perspective bottom view of a metal component of the stationary blade shown in FIG. 3;

FIG. 6 is a cross-sectional view of the stationary blade shown in FIG. 4 taken along the line VI-VI in FIG. 4;

FIG. 7 is a partial cross-sectional side view of the stationary blade shown in FIG. 4 taken along the line VII-VII in FIG. 4;

FIG. 8 is an enlarged detailed view of the stationary blade shown in FIG. 6 at a leading edge portion thereof;

FIG. 9 is an enlarged detailed view of the metal component of the stationary blade basically corresponding to the view of FIG. 8;

DETAILED DESCRIPTION OF THE INVENTION

Figure 1:
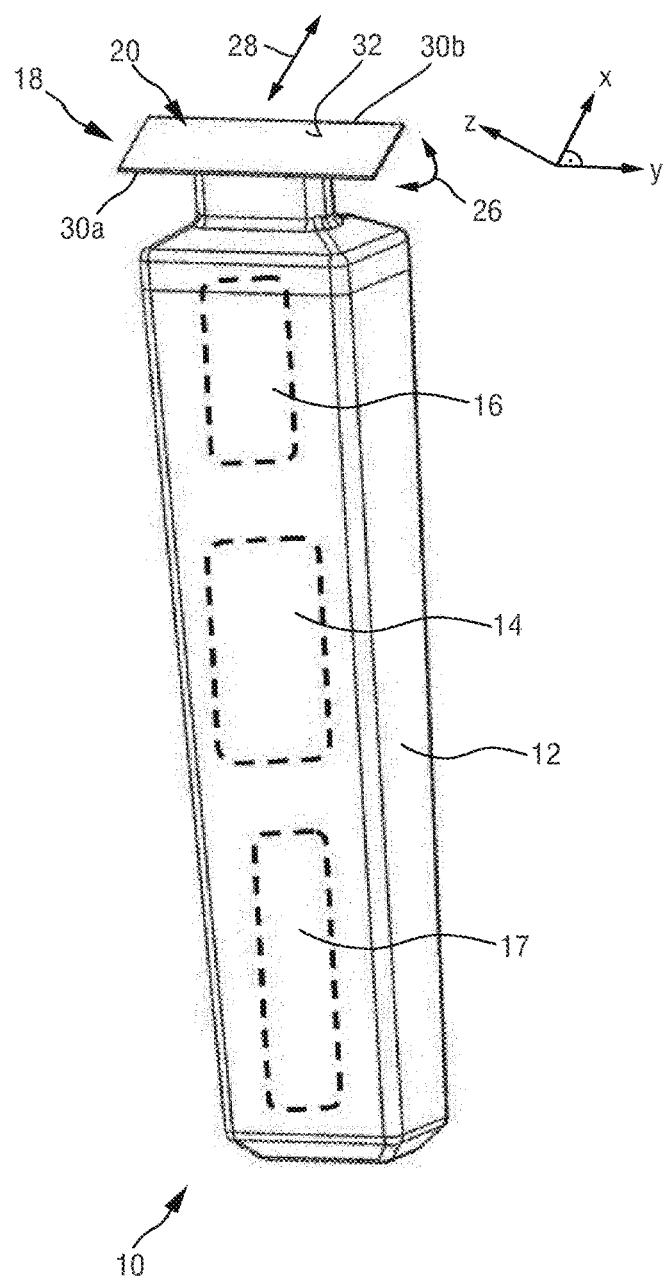
FIG. 1 shows a schematic perspective view of an exemplary electric hair cutting appliance fitted with an exemplary embodiment of a blade set in accordance with the present disclosure.

FIG. 1 schematically illustrates, in a simplified perspective view, an exemplary embodiment of a hair cutting appliance 10, particularly an electric hair cutting appliance 10. The cutting appliance 10 may comprise a housing 12, a motor 14 (indicated by a dashed block) in the housing 12, and a drive mechanism or drivetrain 16 (indicated by a dashed block) in a housing 12. For powering the motor 14, at least in some embodiments of the cutting appliance 10, an electrical battery 17, indicated by a dashed block in the housing 12, may be provided, such as, for instance, a rechargeable battery, a replaceable battery, etc. However, in some embodiments, the cutting appliance 10 may be further provided with a power cable for connecting a power supply. A power supply connector may be provided in addition or in the alternative to the (internal) electrical battery 17.

The cutting appliance 10 may further comprise a cutting head 18. At the cutting head 18, a blade set 20 may be attached to the hair cutting appliance 10. The blade set 20 may be driven by the motor 14 via the drive mechanism or drivetrain 16 to enable a cutting motion. The cutting motion may generally be regarded as a relative motion between a stationary blade 22 and a movable cutter blade 24 which are shown and illustrated in more detail in FIG. 3, for instance, and will be described and discussed hereinafter. Generally, a user may grasp, hold and manually guide the cutting appliance 10 through hair in a moving direction 28 to cut hair. The cutting appliance 10 may be generally regarded as a hand-guided and hand-operated electrically powered device. Furthermore, the cutting head 18 or, more particularly, the blade set 20 can be connected to the housing 12 of the cutting appliance 10 in a pivotable manner, refer to the curved double-arrow indicated by reference numeral 26 in FIG. 1. In some embodiments, the cutting appliance 10 or, more specifically, the cutting head 18 including the blade set 20 can be moved along skin to cut hair growing at the skin. When cutting hair closely to the skin, basically a shaving operation can be performed aiming at cutting or chopping hair at the level of the skin. However, also clipping (or trimming) operations may be envisaged, wherein the cutting head 18 comprising the blade set 20 is passed along a path at a desired distance relative to the skin.

When being guided moved through hair, the cutting appliance 10 including the blade set 20 is typically moved along a common moving direction which is indicated by the reference numeral 28 in FIG. 1. It is worth mentioning in this connection that, given that the hair cutting appliance 10 is typically manually guided and moved, the moving direction 28 thus not necessarily has to be construed as a precise geometric reference having a fixed definition and relation with respect to the orientation of the hair cutting appliance 10 and its cutting head 18 fitted with the blade set 20. That is, an overall orientation of the hair cutting appliance 10 with respect of the to-be-cut hair at the skin may be construed as somewhat unsteady. However, for illustrative purposes, it may be fairly assumed that the (imaginary) moving direction 28 is parallel (or generally parallel) to a main central plane of a coordinate system which may serve in the following as a means for describing structural features of the hair cutting appliance 10.

For ease of reference, coordinate systems are indicated in several drawings herein. By way of example, a Cartesian coordinate system X-Y-Z is indicated in FIG. 1. An axis X of the respective coordinate system extends in a generally longitudinal direction that is generally associated with length, for the purpose of this disclosure. An axis Y of the coordinate system extends in a lateral (or transverse) direction associated with width, for the purpose of this disclosure. An axis Z of the coordinate system extends in a height (or vertical) direction which may be referred to for illustrative purposes, at least in some embodiments, as a generally vertical direction. It goes without saying that an association of the coordinate system X-Y-Z to characteristic features and/or embodiments of the hair cutting appliance 10 is primarily provided for illustrative purposes and shall not be construed in a limiting way. It should be understood that those skilled in the art may readily convert and/or transfer the coordinate system provided herein when being confronted with alternative embodiments, respective figures and illustrations including different orientations. It is further worth mentioning that, for the purpose of the present disclosure, the coordinate system X-Y-Z is generally aligned with main directions and orientations of the cutting head 18 including the blade set 20.

Figure 2:
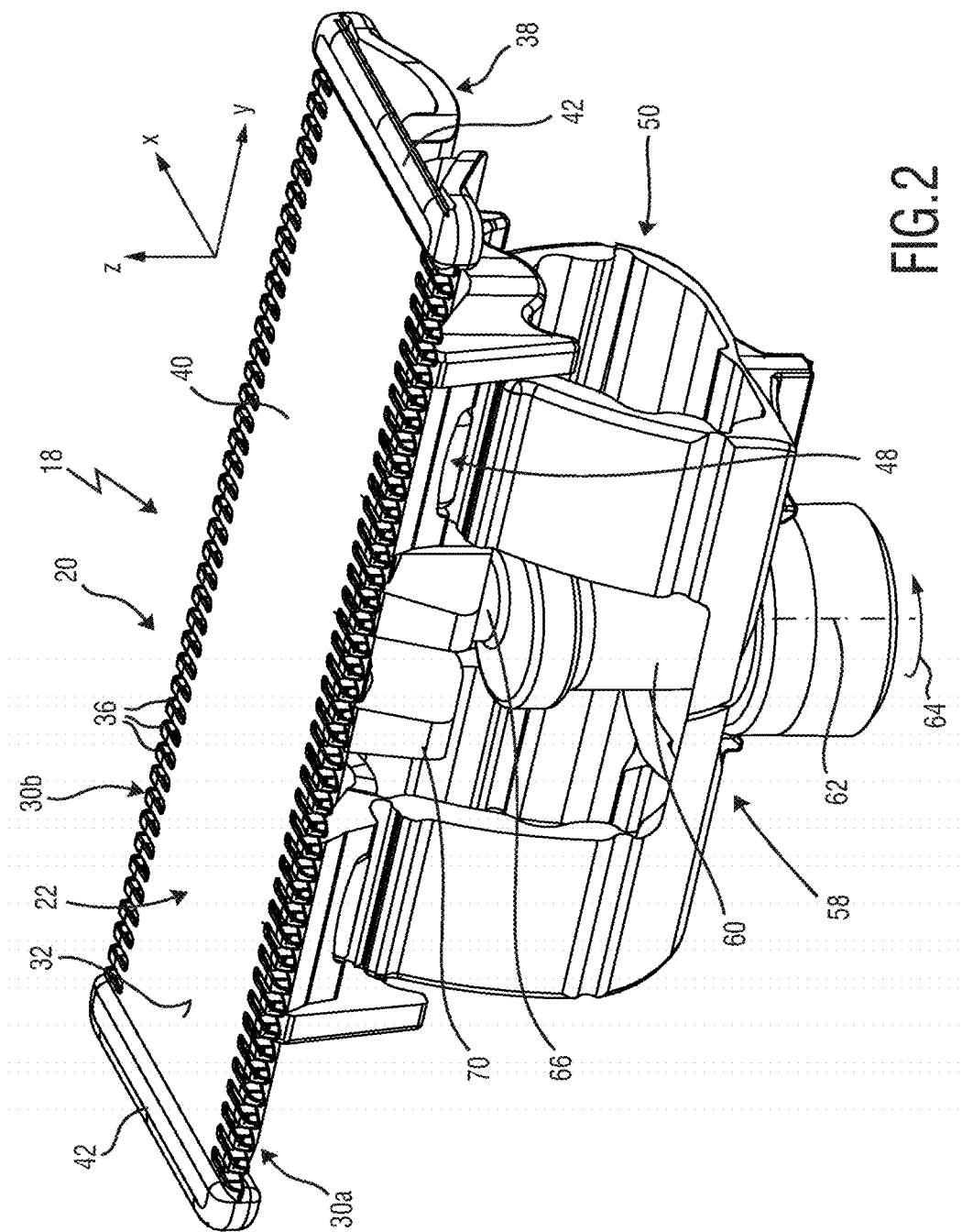
FIG. 2 shows a schematic top view of a cutting head comprising a blade set in accordance with the present disclosure, the cutting head being attached to a linkage mechanism.

FIG. 2 illustrates a perspective top view of an exemplary embodiment of the cutting head 18 that may be attached to the hair cutting appliance as shown in FIG. 1. The cutting head 18 is provided with the blade set 20 as already indicated above. The blade set 20 comprises a stationary blade 22 and a movable cutter blade 24 (hidden in FIG. 2). Further reference is made in this connection to the exploded view of the blade set 20 shown in FIG. 3. The stationary blade 22 and the movable cutter blade 24 are configured to be moved with respect to each other, thereby cutting hairs at their respective cutting edges.

The stationary blade 22 further comprises a top surface 32 which may be regarded as a skin-facing surface. Typically, when in operation as a shaving device, the hair cutting appliance 10 is oriented in such a way that the top surface 32 is basically parallel to or slightly inclined with respect to the skin. However, also alternative operation modes may be envisaged, where the top surface 32 is not necessarily parallel or, at least, substantially parallel to the skin. For instance, the hair cutting appliance 10 may be further used for beard styling or, more generally, hair styling. Hair styling may aim at the processing of considerably sharp edges or transitions between differently treated hair portions or beard portions of the user. By way of example, hair styling may involve precise shaping of sideburns or further distinct patches of facial hair. Consequently, when used in a styling mode, the top surface 32 and the currently to-be-treated skin portion are arranged at an angle, particularly substantially perpendicular to each other.

However, primarily for illustrative purposes, the top surface 32 and similarly oriented portions and components of the hair cutting appliance 10 may be regarded as skin-facing components and portions hereinafter. Consequently, elements and portions that are oriented in an opposite manner may be regarded as rearwardly oriented elements and portions or rather as elements and portions facing away from the skin hereinafter, for the purpose of disclosure.

As already indicated above, the stationary blade 22 may define at least one toothed leading edge 30. As shown in FIG. 2, the stationary blade 22 may define a first leading edge 30a and a second leading edge 30b that are offset from each other in the longitudinal direction X. The at least one of the first and second leading edges 30a, 30b may generally extend in the lateral direction Y. The top surface 32 may be regarded as a surface that is generally parallel to a plane defined by the longitudinal direction X and the lateral direction Y. At the at least one toothed leading edge 30, a plurality of teeth 36 of the stationary blade 22 may be provided. The teeth 36 may alternate with respective teeth slots. The teeth slots may define gaps between the teeth 36. Hairs may enter the gaps when the hair cutting appliance 10 is moved through hair in the moving direction 28 (FIG. 1).

The stationary blade 22 may be arranged as a metal-plastic composite component, for instance. In other words, the stationary blade 22 may be obtained from a multi-step manufacturing method that may include providing a metal component 40 (see also FIG. 3) and forming or, more precisely, molding a plastic component 38 including bonding the metal component 40 and the plastic component 38. This may particularly involve forming the stationary blade 22 by an insert-molding process, outsert-molding process or by an overmolding process. Generally, the stationary blade 22 may be regarded as a two-component stationary blade 22. However, since the stationary blade 22 is preferably formed by an integrated manufacturing process, basically no conventional assembly steps are required when forming the stationary blade 22. Rather, the integrated manufacturing process may include a net-shape manufacturing step or, at least, a near-net-shape manufacturing process. By way of example, molding the plastic component 38 which may also include bonding the plastic component 38 to the metal component 40 may readily define a near-net-shape or a net-shape configuration of the stationary blade 22. It is particularly preferred that the metal component 40 is made from sheet metal. It is particularly preferred that the plastic component 38 is made from injection-moldable plastic material.

Forming the stationary blade 22 from of different components, particularly integrally forming the stationary blade 22 may further have the advantage that portions thereof that have to endure high loads during operation may be formed from respective high-strength materials (e.g. metal materials) while portions thereof that are generally not exposed to huge loads when in operation may be formed from different materials which may significantly reduce manufacturing costs. Forming the stationary blade 22 as a plastic-metal composite part may further have the advantage that skin contact may be experienced by the user as being more comfortable. Particularly the plastic component 38 may exhibit a greatly reduced thermal conductivity when compared with the metal component 40. Consequently, heat emission sensed by the user when cutting hair may be reduced. In conventional hair cutting appliances, heat generation may be regarded as a huge barrier for improving the cutting performance. Heat generation basically limits the power and/or cutting speed of hair cutting appliances. By adding basically heat insulating materials (e.g. plastic materials) heat transfer from heat-generating spots (e.g. cutting edges) to the user's skin may be greatly reduced. This applies in particular at the tips of the teeth 36 of the stationary blade 22 which may be formed of plastic material.

Forming the stationary blade 22 as an integrally formed metal-plastic composite part may further have the advantage that further functions may be integrated in the design of the stationary blade 22. In other words, the stationary blade 22 may provide an enhanced functionality without the need of attaching or mounting additional components thereto.

By way of example, the plastic component 38 of the stationary blade 22 may be fitted with lateral protecting elements 42 which may also be regarded as so-called lateral side protectors. The lateral protecting elements 42 may cover lateral ends of the stationary blade 22, refer also to FIGS. 3 and 10. Consequently, direct skin contact at the relatively sharp lateral ends of the metal component 40 can be prevented. This may be particularly beneficial since the metal component 40 of the stationary blade 22 is relatively thin so as to allow to cut hairs close to the skin when shaving. However, at the same time, the relatively thin arrangement of the metal component 40 might cause skin irritation when sliding on the skin surface during shaving. Since particularly the skin-contacting portion of the metal component 40 may be actually so thin that relatively sharp edges may remain, the risk of skin irritations or even skin cuts may be the higher the thinner the metal component 40 and the stationary blade 22 actually is. It is therefore preferred, at least in some embodiments, to shield lateral sides of the metal component 40. The lateral protecting elements 42 may protrude from the top surface in the vertical direction or height direction Z. The at least one lateral protecting element 42 may be formed as an integrated part of the plastic component 38.

The stationary blade 22 may be further provided with mounting elements 48 that may enable a quick attachment to and a quick release from a linkage mechanism 50. The mounting elements 48 may be arranged at the plastic component 38, particularly integrally formed with the plastic component 38, refer also to FIGS. 3 and 10. The mounting elements 48 may comprise mounting protrusions, particularly snap-on mounting elements. The mounting elements 48 may be configured to cooperate with respective mounting elements at the linkage mechanism 50. It is particularly preferred that the blade set 20 can be attached to the linkage mechanism 50 without any further separate attachment member.

The linkage mechanism 50 (refer to FIG. 2) may connect the blade set 20 and the housing 12 of the hair cutting appliance 10. The linkage mechanism 50 may be configured such that the blade set 20 may swivel or pivot during operation when being guided through hair. The linkage mechanism 50 may provide the blade set 20 with a contour following capability. In some embodiments, the linkage mechanism 50 is arranged as a four-bar linkage mechanism. This may allow for a defined swiveling characteristic of the blade set 20. The linkage mechanism 50 may define a virtual pivot axis for the blade set 20.

FIG. 2 further illustrates an eccentric coupling mechanism 58. The eccentric coupling mechanism 58 may be regarded as a part of the drive mechanism or drivetrain 16 of the hair cutting appliance 10. The eccentric coupling mechanism 58 may be arranged to transform a rotational driving motion, refer to a curved arrow indicated by reference numeral 64 in FIG. 2, into a reciprocating motion of the movable cutter blade 24 with respect to the stationary blade 22, refer also to FIG. 12 in this connection (double-arrow denoted by reference numeral 126). The eccentric coupling mechanism 58 may comprise a driveshaft 60 that is configured to be driven for rotation about an axis 62. At a front end of the driveshaft 60 facing the blade set 20 an eccentric portion 66 may be provided. The eccentric portion 66 may comprise a cylindrical portion which is offset from the (central) axis 62. Upon rotation of the driveshaft 60, the eccentric portion 66 may revolve around the axis 62. The eccentric portion 66 is arranged to engage a transmitting member 70 which may be attached to the movable cutter blade 24.

With further reference to the exploded view shown in FIG. 3, the transmitting member 70 will be further detailed and described. The transmitting member 70 may comprise a reciprocating element 72 which may be configured to be engaged by the eccentric portion 66 of the driveshaft 60, refer also to FIG. 2. Consequently, the reciprocating element 72 may be reciprocatingly driven by the driveshaft 60. The transmitting member 70 may further comprise a connector bridge 74 which may be configured to contact the movable cutter blade 24, particularly a main portion 78 thereof. By way of example, the connector bridge 74 may be bonded to the movable cutter blade 24. Bonding may involve soldering, welding and similar processes. However, at least in some embodiments, the connector bridge 74 or a similar connecting element of the transmitting member 70 may be rather attached to the movable cutter blade 24. As used herein, attaching may involve plugging in, pushing in, pressing in or similar mounting operations. The transmitting member 70 may further comprise a mounting element 76 which may be arranged at the connector bridge 74. At the mounting element 76, the reciprocating element 72 may be attached to the connector bridge 74. By way of example, the connector bridge 74 and the mounting element 76 may be arranged as a metal part. By way of example, the reciprocating element 72 may be arranged as a plastic part. For instance, the mounting element 76 may involve snap-on elements for fixing the reciprocating element 72 at the connector bridge 74. However, in the alternative, the mounting element 76 may be regarded as an anchoring element for the reciprocating element 72 when the latter one is firmly bonded to the connector bridge 74.

It is worth mentioning in this regard that the transmitting member 70 may be primarily arranged to transmit a lateral reciprocating driving motion to the movable cutter blade 24. However, the transmitting member 70 may be further arranged to serve as a loss prevention device for the movable cutter blade 24 at the blade set 20.

FIG. 3 further illustrates the plastic component 38 and the metal component 40 of the stationary blade 22 in an exploded state. It is worth mentioning in this connection that, since it is preferred that the stationary blade 22 is integrally formed, the plastic component 38 thereof typically does not exist as such in an isolated unique state. Rather, at least in some embodiments, forming the plastic component 38 may necessarily involve firmly bonding the plastic component 38 to the metal component 40.

The stationary blade 22 may comprise at least one lateral opening 68 through which the movable cutter blade 24 may be inserted. Consequently, the movable cutter blade may be inserted in the lateral direction Y. However, at least in some embodiments, the transmitting member 70 may be moved to the movable cutter blade 24 basically along the vertical direction Z. Mating the movable cutter blade 24 and the transmitting member 70 may therefore involve firstly inserting the movable cutter blade 24 through the lateral opening 68 of the stationary blade 22 and secondly, when the movable cutter blade 24 is arranged in the stationary blade 22, feeding or moving the transmitting member along the vertical direction Z to the stationary blade 22 so as to be connected to the movable cutter blade 24.

Generally, the movable cutter blade 24 may comprise at least one toothed leading edge 80 adjacent to the main portion 78. Particularly, the movable cutter blade 24 may comprise a first toothed leading edge 80a and a second toothed leading edge 80b that is longitudinally offset from the first toothed leading edge 80a. At the at least one toothed leading edge 80, a plurality of teeth 82 may be formed that are alternating with respective tooth slots. Each of the teeth 82 may be provided with respective cutting edges 84, particularly at their lateral flanks. The at least one toothed leading edge 80 of the movable cutter blade 24 may be arranged to cooperate with a respective toothed leading edge 30 of the stationary blade 22 when relative motion of the movable cutter blade 24 and the stationary blade 22 is induced. Consequently, the teeth 36 of the stationary blade 22 and the teeth 82 of the movable cutter blade 24 may cooperate to cut hair.

With particular reference to FIGS. 4 to 9, the structure and configuration of an exemplary embodiment of the stationary blade 22 will be further detailed and illustrated. FIG. 4 is a partial top view of the stationary blade 22, wherein hidden portions of the metal component 40 (refer also to FIG. 5) are shown for illustrative purposes. At the teeth 36 of the stationary blade 22 tips 86 may be formed. The tips 86 may be primarily formed by the plastic component 38. However, substantial portions of the teeth 36 may be formed by the metal component 40. As can be best seen from FIG. 5, the metal component 40 may comprise so-called tooth stem portions 88 that may form a substantial portion of the teeth 36. The tooth stem portions 88 may be provided with respective cutting edges 94 that are configured to cooperate with cutting edges 84 of the teeth 82 of the movable cutter blade 24. At longitudinal ends of the tooth stem portions 88, anchoring elements 90 may be arranged. The anchoring elements 90 may be regarded as positive fit contact elements which may further strengthen the connection of the metal component 40 and the plastic component 38.

By way of example, the anchoring elements 90 may be provided with undercuts or recess portions. Consequently, the anchoring elements 90 may be arranged as barbed anchoring elements. Preferably, a respective portion of the plastic component 38 that contacts the anchoring elements 90 may not be detached or released from the metal component 40 without being damaged or even destroyed. In other words, the plastic component 38 may be inextricably linked with the metal component 40. As shown in FIG. 5, the anchoring elements 90 may be provided with recesses or holes 92. The holes 92 may be arranged as slot holes, for instance. When molding the plastic component 38, plastic material may enter the holes 92. As can be best seen from FIGS. 6 and 8, the plastic material may fill the recesses or holes 92 of the anchoring elements 90 from both (vertical) sides, i.e. from the top side and the bottom side. Consequently, the anchoring elements 90 may be entirely covered by the plastic component 38. Adjacent to the anchoring elements 90, the tips 86 may be formed. Forming the tips 86 from the plastic component 38 may further have the advantage that the frontal end of the toothed leading edge 30 is formed from a relatively soft material which may be further rounded or chamfered so as to soften edges. Consequently, contacting the user's skin with the frontal ends of the toothed leading edge 30 is typically not experienced as causing skin irritation or similar adverse effects. Also high-temperature spots may be prevented at the teeth 36 since the plastic component 38 is typically provided with a relatively low thermal conductivity coefficient, compared with the metal component 40.

As can be best seen from the cross-sectional views of FIGS. 6, 7 and 8, the edges of the tips 86 of the teeth 36 at the frontal ends of the toothed leading edges 30 may be significantly rounded. As can be further seen, the transition between the metal component 40 and the plastic component 38 at the top surface 32 in the region of the teeth 36 may be substantially seamless or step-less. Further reference in this regard is made to FIG. 9. It may be advantageous to shape the anchoring elements 90 such that their top side (skin-facing side) is offset from the top surface 32. Consequently, also the skin-facing side of the anchoring elements 90 may be covered by the plastic component, refer also to FIG. 8. In one embodiment, the anchoring elements 90 may be inclined with respect to the top surface 32. The anchoring elements 90 may be arranged at an angle α (alpha) with respect to the tooth stem portions 88. It may be further preferred that the anchoring elements 90 are rearwardly bended with respect to the top surface 32. At least in some embodiments, the anchoring elements 90 may be thinner than the tooth stem portions 88. This may further enlarge the space which may be filled by the plastic component 38 when molding.

With further reference to FIG. 6, the stationary blade 22 will be further detailed and described. The stationary blade 22 may define and encompass a guide slot 96 for the movable cutter blade 24. To this end, the stationary blade 22 may comprise a first wall portion 100 and a second wall portion 102. For the purpose of this disclosure, the first wall portion 100 may be regarded as a skin-facing wall portion. This applies in particular when the blade set 20 is used for shaving. Consequently, the second wall portion 102 may be regarded as the wall portion facing away from the skin. In other words, the first wall portion 100 may be also referred to as top wall portion. The second wall portion 102 may also be referred to as bottom wall portion.

The first wall portion 100 and the second wall portion 102 may jointly define the teeth 36 of the stationary blade. The teeth 36 may comprise a slot or gap for the movable cutter blade 24, particularly for the teeth 82 thereof arranged at the at least one toothed leading edge 80. As indicated above, at least a substantial portion of the first wall portion 100 may be formed by the metal component 40. At least a substantial portion of the second wall portion 102 may be formed by the plastic component 38. At the exemplary embodiment illustrated in FIG. 6, the second wall portion 102 is entirely formed by the plastic component 38. Rather, the first wall portion 100 is jointly formed by the plastic component 38 and the metal component 40. This applies in particular at the toothed leading edge 30. The first wall portion 100 may comprise, at the respective tooth portions thereof, bonding portions 106, where the plastic component 38 is bonded to the metal component 40. The bonding portions 106 may involve the anchoring elements 90 of the metal component 40 and the plastic material of the plastic component 38 covering the anchoring elements 90.

FIG. 6 and FIG. 8 illustrate a cross-section through a tooth 36, refer also to the line VIII-VIII in FIG. 4. By contrast, FIG. 7 illustrates a cross-section through a tooth slot, refer to line VII-VII in FIG. 4. As can be seen from FIG. 6 and FIG. 7, the first wall portion 100 and the second wall portion 102 may jointly form the toothed leading edge 30 including the teeth 36. The first wall portion 100 and the second wall portion 102 may jointly define a basically U-shaped lateral cross-section of the respective teeth 36. The first wall portion 100 may define a first leg 110 of the U-shaped form. The second wall portion 102 may define a second leg of the U-shaped form. The first leg 110 and the second leg 112 may be connected at the tips 86 of the teeth 36. Between the first leg 110 and the second leg 112 a slot or gap for the movable cutter blade 24 may be provided.

As can be further seen from FIG. 6, the first wall portion 100 may be significantly thinner than the second wall portion 102 of the stationary blade 22. Consequently, at the skin-facing first wall portion 100, hair can be cut very close to the skin. It is therefore desirable to reduce the thickness of the first wall portion 100, particularly of the metal component 40. By way of example, the thickness $l_{tm}$ (refer to FIG. 7) of the metal component 40, particularly at the tooth stem portions 88, may be in the range of about 0.08 mm to 0.15 mm. Consequently, the first wall portion 100 as such may exhibit a considerably small strength and rigidity. It is therefore beneficial to back up or strengthen the first wall portion 100 by adding the second wall portion 102. Since the thickness of the second wall portion 102 basically does not influence the smallest achievable cutting length (e.g. the length of remaining hairs at the skin), the thickness of the second wall portion 102, particularly at the respective toothed leading edges 30, may be significantly greater than the thickness $l_{tm}$ of the first wall portion 100, particularly of the metal component 40. This may provide the stationary blade 22 with sufficient strength and stability. As can be further seen from FIG. 6, the first wall portion 100 and the second wall portion 102 may basically form a closed profile, at least sectionally along their lateral extension, refer also to FIG. 10 and FIG. 11 in this connection. This may particularly apply when the stationary blade 22 is provided with the first and second leading edges 30a, 30b. Consequently, the stiffness of the stationary blade 22, particularly the stiffness against bending stress or torsional stress may be further increased.

In one embodiment, the second wall portion 102 may comprise, adjacent to the second leg 112 at the respective toothed leading edge 30, a first inclined portion 116. Assuming that the stationary blade 22 is basically symmetrically shaped with respect to a central plane defined by the vertical direction Z and the lateral direction Y, the second wall portion 102 may further comprise a central portion 118 adjacent to the inclined portion 116. Consequently, the central portion 118 may be interposed between a first inclined portion 116 and a second inclined portion 116. The first inclined portion 116 may be positioned adjacent to a respective second leg 112 at a first leading edge 30a. The second inclined portion 116 may be positioned adjacent to a respective second leg at the second leading edge 30b. As can be best seen in FIG. 6, the second wall portion 102 may therefore comprise a basically M-shaped cross-section primarily defined by the inclined portions 116 and the central portion 118.

Figure 10:
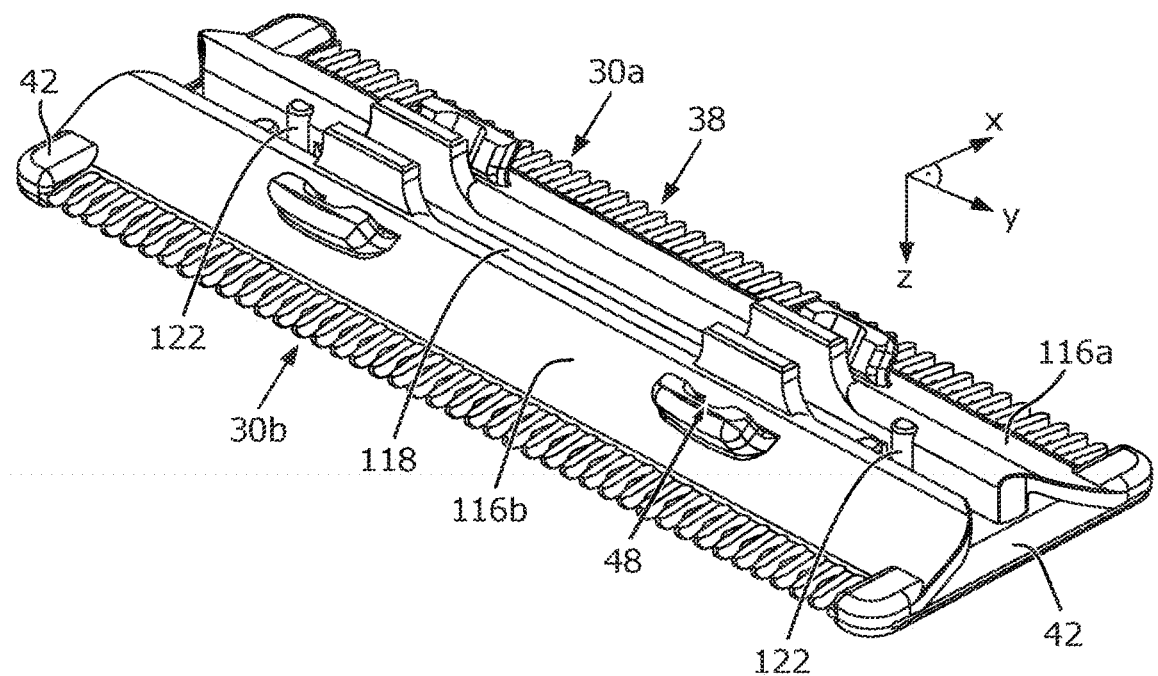
FIG. 10 is a perspective bottom view of a plastic component of the stationary blade shown in FIG. 2 and FIG. 3.
Figure 11:
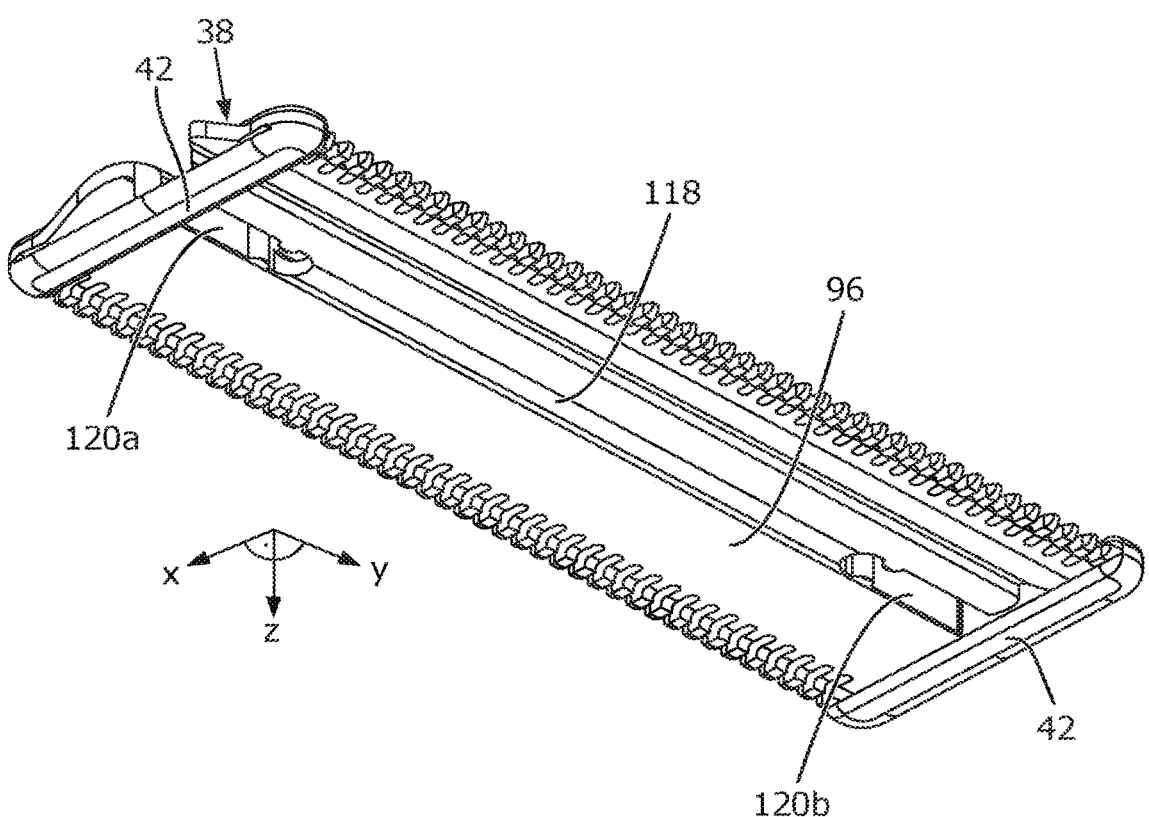
FIG. 11 is a perspective top view of the plastic component shown in FIG. 10.

With further reference to FIG. 10 and FIG. 11, the shape and configuration of an exemplary embodiment of the plastic component 38 of the stationary blade 22 is further detailed and described. As can be best seen in FIG. 10, the inclined portions 116a, 116b may basically extend for the whole (lateral) length of the plastic component 38. The first and second leading edges 30a, 30b may generally extend between lateral protecting elements 42 that are arranged at opposite (lateral) ends of the plastic component 38. A recessed portion of the plastic component shown in FIG. 8 which basically defines a bottom side of the guide slot 96 is generally covered by the metal component 40, refer to FIG. 2.

As can be best seen from FIG. 11, the central portion 118 between the inclined portions 116a, 116b may generally extend for a substantial portion of the entire (lateral) length of the plastic component 38. However, alongside the central portion 118, at least one opening slot 120a, 120b may be provided. According to the exemplary embodiment shown in FIG. 10 and FIG. 11, the central portion 118 may be arranged between a first opening slot 120a, 120b and a second opening slot 120b. The opening slots 120a, 120b may define at least one opening through which, in the assembled state, the movable cutter blade 24 may be contacted by the transmitting member 70. As can be best seen in FIG. 10, the plastic component 38 may further comprise at least one guide element 122, particularly a plurality of guide elements 122 that may be configured to guide the connector bridge 74 and, consequently, the movable cutter blade 24 connected thereto. In one embodiment, the plurality of guide elements 122 may be arranged in pairs, wherein respective pairs are arranged at laterally offset ends of the central portion 118. The guide elements 122 may be arranged as basically vertically extending convexly shaped profiles. The guide elements 122 may define a longitudinal position of the transmitting member 70 and the movable cutter blade 24.

It is further worth mentioning in this regard that the central portion 118 and particularly the at least one opening slot 120a, 120b for the transmitting member 70 may be differently configured in alternative embodiments. By way of example, in one embodiment, the central portion 118 is interrupted by a single opening slot 120a or 120b through which the connector bridge 74 may contact the movable cutter blade 24. It is therefore emphasized that the connector bridge 74 of the transmitting member 70 does not necessarily have to comprise two contact spots for the movable cutter blade 24 that are considerably spaced from each other in the lateral direction Y, as can be seen in FIG. 3. Rather, the connector bridge 74 may also contact the movable cutter blade 24 at a (lateral) central portion.

Figure 12:
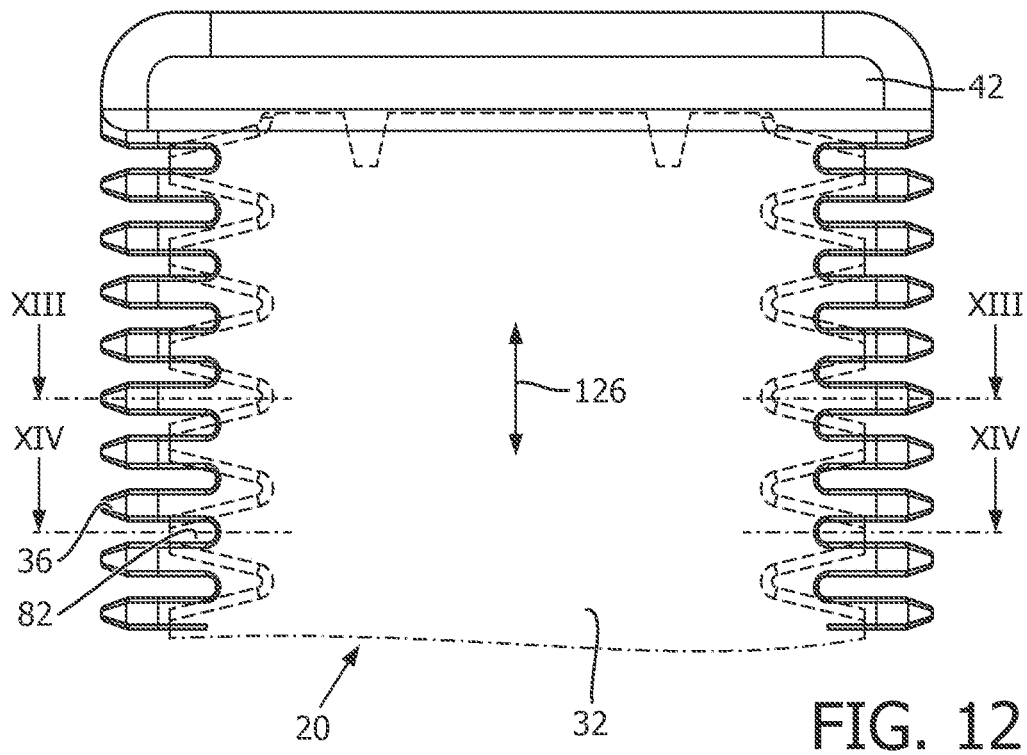
FIG. 12 is a partial top view of the blade set shown in FIG. 2 and FIG. 3, wherein hidden contours of a movable cutter blade thereof are indicated by dashed lines primarily for illustrative purposes.
Figure 13:
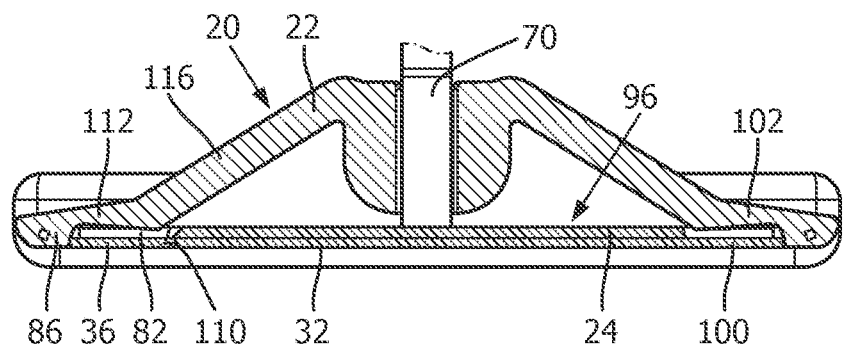
FIG. 13 is a cross-sectional side view of the blade set shown in FIG. 12 taken along the line XIII-XIII in FIG. 12.
Figure 14:
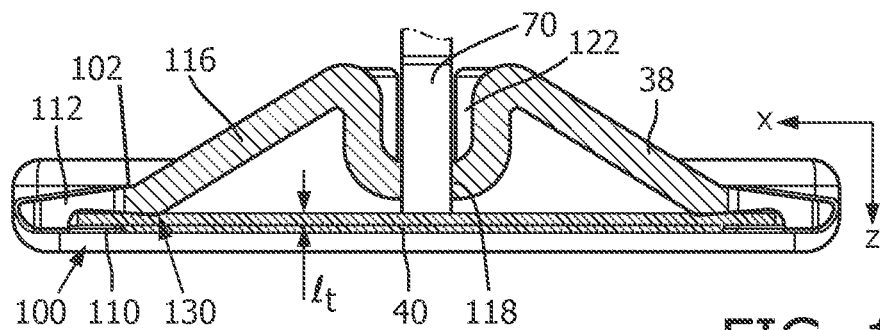
FIG. 14 is a further cross-sectional side view of the blade set shown in FIG. 12 taken along the line XIV-XIV in FIG. 12.

With particular reference to FIGS. 12, 13 and 14, the blade set 20 including the stationary blade 22 being fitted with the movable cutter blade 24 is further detailed and described. FIG. 12 is a partial top view of the blade set 20, wherein hidden contours of the movable cutter blade 24 are indicated by dashed lines. FIG. 13 is a cross-sectional view of the arrangement shown in FIG. 12, wherein the section involves a tooth 36 at the stationary blade 22 and a tooth slot at the movable cutter blade 24, refer to the line XIII-XIII in FIG. 12. By contrast, the cross-sectional view shown in FIG. 14 includes a section through a tooth slot at the stationary blade 22 and a tooth 82 at the movable cutter blade 24, refer to line XIV-XIV in FIG. 12. The movable cutter blade 24 can be driven with respect to the stationary blade 22 in a reciprocating manner, refer to a double-arrow indicated by 126 in FIG. 12. Upon relative motion of the stationary blade 22 and the movable cutter blade 24, the respective teeth 36 and 82 may cooperate to cut hairs that enter the respective tooth slots.

The transmitting member 70 which is basically configured to transmit the driving motion to the movable cutter blade 24 may extend through the stationary blade 22, particularly through the at least one opening slot 120a, 120b associated with the central portion 118 of the stationary blade 22, refer to FIG. 11. FIG. 14 further shows a pair of guide elements 122 that may guide the transmitting member 70 and, consequently, the movable cutter blade 24. The guide elements 122 may define the longitudinal position of the transmitting member 70 and the movable cutter blade 24 at the stationary blade 22.

It is particularly preferred that, at least in some embodiments, the movable cutter blade 24 is arranged in the guide slot 96 in a defined manner. It may be further preferred that no further mounting member, particularly no biasing member is required for keeping the movable cutter blade 24 in its desired position and in close contact with the first wall portion 100. This may be achieved since the stationary blade 22 is provided with the first wall portion 100 and the second wall portion 102 opposite to the first wall portion 100. Both the first and second wall portions 100, 102 may define a precise mating slot for the movable cutter blade 24, particularly for the teeth 82 thereof, such that the vertical position (Z-position) of the movable cutter blade 24 may be defined at close tolerances. This may significantly reduce manufacturing and assembly costs of the blade set 20.

By way of example, the stationary blade 22 and the movable cutter blade 24 may be configured such that the movable cutter blade 24 at least sectionally contacts the first wall portion 100 in a substantially planar fashion. This may particularly apply to respective tooth portions. It is worth mentioning in this connection that such a configuration does not require perfect surface contact in practice when the blade set 20 is operated. By contrast, it may be assumed that the stationary blade 22 and/or the movable cutter blade 24 may be flexed or preloaded, at least when in operation, such that only small contact areas remain. However, the first wall portion 100 may serve at least as a defined limit stop for the movable cutter blade 24 in the (vertical) direction Z. The second wall portion 102 may comprise a protruding contact surface 130 which is associated with a respective toothed leading edge 30. The protruding contact surface 130 may be arranged at a transition between the second leg 112 and the inclined portion 116 of the second wall portion 102, refer to FIG. 14. The protruding contact surface 130 may define a resulting gap or height dimension at the guide slot 96 for the movable cutter blade 24. The resulting gap $l_{cl}$ (refer to FIG. 7) may be defined such that a defined clearance for the to-be-mounted movable cutter blade 24 is provided. Consequently, the movable cutter blade 24 may be arranged at the stationary blade 22 without significant preload, at least in an inactive state. However, in yet another embodiment, the gap or height dimension for the to-be-mounted movable cutter blade 24 in the slot 96 may be defined such that basically an interference fit is provided. Consequently, the movable cutter blade 24 may be at least slightly preloaded by the stationary blade 22. The height dimension or thickness dimension $l_t$ (refer to FIG. 14) of the movable cutter blade 24, at least at the at least one toothed leading edge 80 thereof, may be in the range of 0.1 mm to 0.18 mm.

Figure 15:
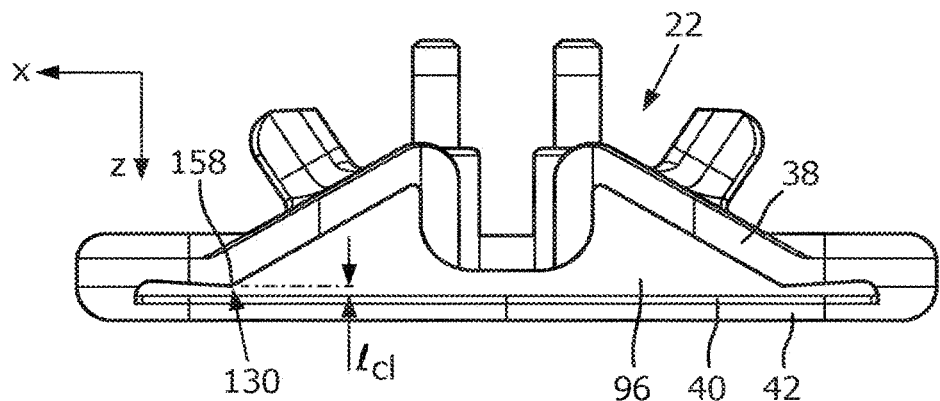
FIG. 15 is a simplified side view of an embodiment of a stationary blade in accordance with FIG. 15 in a basically neutral configuration.
Figure 17:
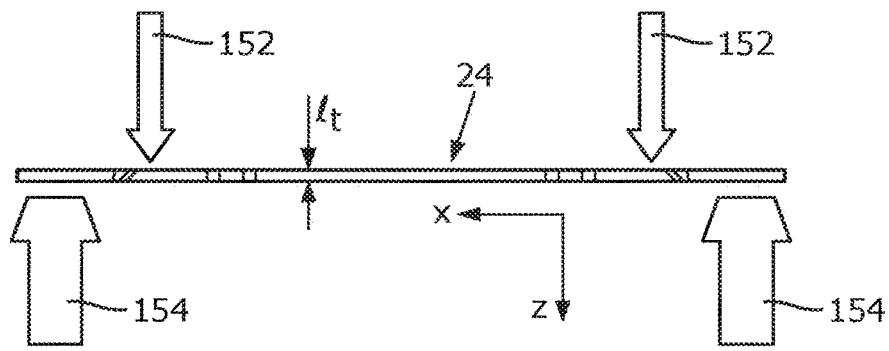
FIG. 17 is a side view of a movable cutter blade configured to cooperate with the stationary blade shown in FIG. 16, wherein resulting contact forces are indicated in FIG. 17 by block arrows.

FIG. 15 shows a side view of a stationary blade 22. Further reference in this regard is made to FIG. 6 illustrating a respective cross-sectional side view. As can be best seen in FIG. 6, the plastic component 38 of the stationary blade 22 may basically form an open profile. A closed profile surrounding the guide slot 96 for the movable cutter blade 24 may be jointly formed by the plastic component 38 and the metal component 40, refer also to FIG. 6. However, with respect to the lateral protecting elements 42 illustrated in FIGS. 10 and 11, for instance, it is worth noting that the plastic component 38 indeed may form a partially closed profile, refer also to FIG. 15. However, particularly at the first and second leading edges 30a, 30b of the stationary blade 22, the plastic component 38 may be regarded as an open profile. As already indicated above, it is particularly preferred that the stationary blade 22 is configured to receive the movable cutter blade 24 in a defined manner without the need of additional biasing elements. It is therefore preferred that the guide slot 96 provides a defined clearance dimension $l_{cl}$ such that a movable cutter blade 24 (refer to FIG. 17) comprising a defined thickness dimension $l_t$ may be mounted therein in a defined manner.

Cutting action of the hair cutting appliance 10 is basically attributable to relative motion of the movable cutter blade 24 with respect to the stationary blade 22, particularly to a reciprocating lateral motion (refer to the arrow 126 in FIG. 12). A relative motion, particularly a relative gliding motion or sliding motion between the movable cutter blade 24 and the stationary blade 22 may basically involve friction and therefore generate heat. It is therefore preferred that the movable cutter blade 24 is received in the guide slot 96 without significant pre-loading forces, particularly without significant pre-loading in the vertical direction (Z-direction). On the other hand, it may be preferred that the movable cutter blade 24 is received at the guide slot 96 basically free of play or, at least, nearly free of play which may involve a mounting of the movable cutter blade 24 with very little clearance in the vertical direction Z. Consequently, defining a resulting clearance dimension $l_{cl}$ in the guide slot 96 may be regarded as a trade-off between reducing (vertical) pre-loading forces—which may be responsible for exaggerating heat generation and power consumption—and minimizing a resulting play (particularly a vertical play) of the movable cutter blade 24 in the guide slot 96—which might diminish cutting performance which even might involve stalling of hairs when a minimum gap (particularly a minimum vertical gap) between the movable cutter blade 24 and the stationary blade 22 at the cutting edges thereof becomes too large.

Since it is, at least in some embodiments, preferred form arrange the stationary blade 22 as a metal-plastic composite component, manufacturing peculiarities have to be considered. Particularly with respect to the plastic component 38, effects that may come along with the molding process have to be considered. Molded parts, particularly injection-molded parts are typically subjected to shrinkage, warpage and, to some extent, to water absorption which may adversely influence the performance of the plastic component 38.

However, when defining the shape and geometry of the plastic component 38 and of a respective mold, one may take shrinkage and warpage into account and therefore shape the mold for the to-be-molded plastic component 38 such that the resulting plastic component 38 comprises the desired shape. In other words, warpage and shrinking may be anticipated which may involve forming the mold with a "wrong" geometry, wherein the plastic component 38, particularly upon cooling down, distorts or shrinks and therefore deforms to the desired final shape. It is further worth mentioning in this regard that distortion and shrinkage may be influenced. This may involve influencing the cooling-down process, for instance by varying the cooling time. A further measure for influencing distortion and warpage may involve placing a cooling gage at the guide slot 96 so as to define its shape when the plastic component 38 is cooling down. Such a cooling gage may be regarded as a dummy for the guide slot 96. Generally, it may be preferred that the guide slot 96 is defined by a substitute component that is placed in the mold for the stationary blades 22 along with the metal component 40. The remaining time of the molded metal-plastic composite stationary blade 22 in the mold but also the remaining time of the substitute component in the guide slot 96 may influence the final shape of the plastic component 38.

When forming the integrated metal-plastic stationary blade 22, one may further have to take into account the fact that the plastic component 38 and the metal component 40 are bonded to each other at the respective toothed leading edge 30, particularly at first and second leading edges 30a, 30b that are oppositely arranged. Consequently, account has to be taken of the fact that basically two different materials (metal materials and plastic materials) are combined. Generally, metal materials, e.g. sheet metal steel may be regarded as considerably stiff with respect to plastic materials. In other words, the metal component 40 basically defines a location of the plastic component 38 at the bonding portions 106 where the anchoring elements 90 and the plastic material are bonded to each other, refer also to FIG. 4 and FIG. 5.

The plastic component 38 and the molding process may be configured such that, in the finished state of the stationary blade 22, the metal component 40 is basically planar and even. Such an embodiment is illustrated in FIG. 15. Consequently, the movable cutter blade 24 (refer to FIG. 17) may basically contact the metal component 40 with at least a substantial portion of its skin-facing side. At its side facing away from the skin, the movable cutter blade 24 may be guided by protruding contact surfaces 130 that define the clearance dimension $l_{cl}$ of the guide slot 96. The protruding contact surfaces 130 may comprise respective contact elements 158. A rear side (or bottom side) of the metal component 40 and the contact element 158 may define the respective gap in the guide slot 96 for the movable cutter blade. It is particularly preferred, at least in some embodiments, to form the plastic component 38 in such a way that the resulting clearing dimension $l_{cl}$ is slightly larger than the thickness dimension $l_t$ of the movable cutter blade 24. However, at least in some alternative embodiments, the clearance dimension $l_{cl}$ of the guide slot 96 may be slightly smaller than the thickness $l_t$ of the movable cutter blade, thereby providing for an interference fed of the movable cutter blade 24 at the stationary blade 22.

In yet another exemplary embodiment, the stationary blade 22 may be deformed upon molding in a defined manner such that a beneficial mounting and contact configuration for the movable cutter blade 24 is achieved. Such an embodiment is further detailed and explained in connection with FIGS. 16 and 17. Plastic material basically shrinks when cooling down after molding. Furthermore, wall sections that are having a relatively small thickness typically solidify faster than wall sections having a greater thickness. The greater the thickness, the more thermal energy a wall section may comprise which needs to be dissipated when cooling down. As already mentioned above, a cooling-down process further may be, at least to some extent, controlled so as to obtain a desired final shape of the stationary blade 22. Cooling down management may further involve selectively operating and controlling a cooling fluid flow in respective flow channels at the mold for the stationary blade 22.

Figure 16:
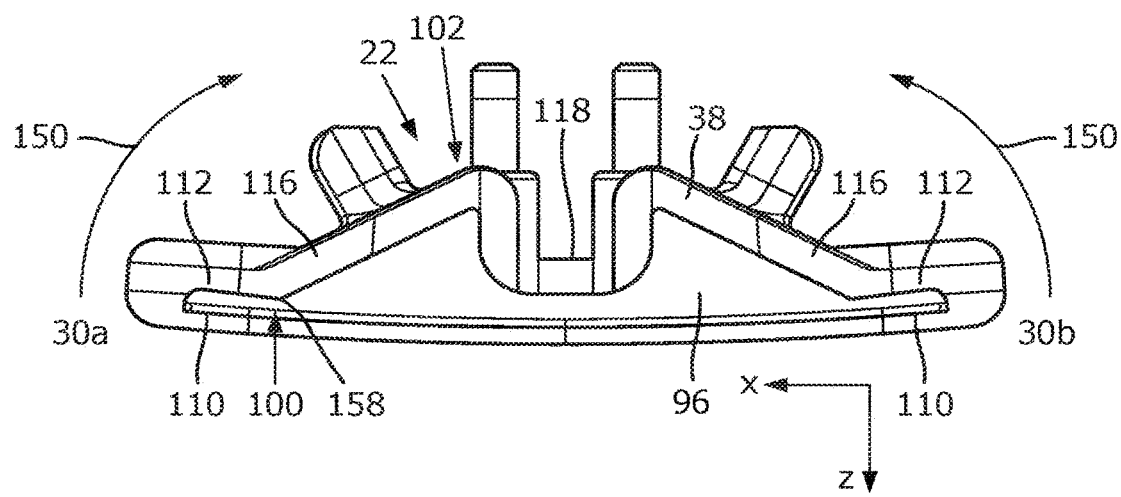
FIG. 16 is a further side view of a stationary blade, the stationary blade being shown in a slightly deformed configuration (deformations shown in an exaggerated state)

As indicated in FIG. 16 in an exaggerated state, one can make profit from shrinkage-related distortion of the plastic component 38. Since the metal component 40 is a relatively stiff part, there will be basically no significant shrinkage at the first wall portion 100 (refer to FIG. 6) which is basically formed by the metal component 40. However, at the second wall portion 102 which is at least substantially formed by the plastic component 38, significant shrinkage and, consequently, distortion may occur. In other words, the second leg 112, the inclined portion 116 and the central portion 118 may undergo a cooling down-related shrinkage. Consequently, the stationary blade 22 as a whole may be slightly deformed, as indicated in FIG. 16 by curved arrows denoted by reference numeral 150. In other words, due to significant shrinkage at the second wall portion 102, the first and second leading edges 30a, 30b of the stationary blade 22 may be rearwardly bended to some extent. This may have several beneficial effects.

Given the dominant overall deformation of the stationary blade 22 shown in FIG. 16, the contact elements 158 at the protruding contact surfaces 130 may be basically inwardly moved with respect to a rear surface or bottom surface of the movable cutter blade 24. This may define a precise contact spot or, more particularly a defined contact line where the movable cutter blade 24 is slightly pre-loaded, refer to respective block arrows designated by reference numeral 152 in FIG. 17. Consequently, the contact elements 158 may slightly urge the movable cutter blade 24 in the vertical direction (Z-direction). On the other hand, given the curved shape of the metal component 40, the respective counter-acting contact force exerted to the top surface or front surface of the movable cutter blade 24 may be applied to the movable cutter blade 24 at longitudinally offset positions, refer to respective block arrows indicated by reference numeral 154 in FIG. 17. For illustrative purposes, the block arrows 154 in FIG. 17 comprise a blunt tip. This may indicate that the counteracting pre-loading force applied from the metal component 40 to the movable cutter blade 24 is basically areally applied thereto (i.e. in a distributed fashion). While at least slightly bended or deformed due to the shrinkage-related distortion of the plastic component 38, the metal component 40 may still be regarded as a relatively flat component. It is particularly preferred that the tooth stem portions 88 (refer to FIG. 5) of the metal component 40 and the teeth 82 of the movable cutter blade 24 are basically aligned and extensively in contact. This may minimize wear, particularly at the respective cutting edges 84, 94 of the teeth 82 and tooth stem portions 88. Furthermore, cutting performance may be increased in this way.

Given the pre-loading applied to the movable cutter blade 24 at the top side and at the bottom side thereof, also the movable cutter blade 24 may be slightly deformed in accordance with the main curved deformation of the stationary blade 22. It is therefore particularly beneficial that a contact spot where the contact force is applied to the bottom surface of the movable cutter blade 24 (reference numerals 152 in FIG. 17) is inwardly offset from a respective contact spot where the pre-load is applied to the top surface of the movable cutter blade 24 (reference numeral 154 in FIG. 17).

Figure 18A:
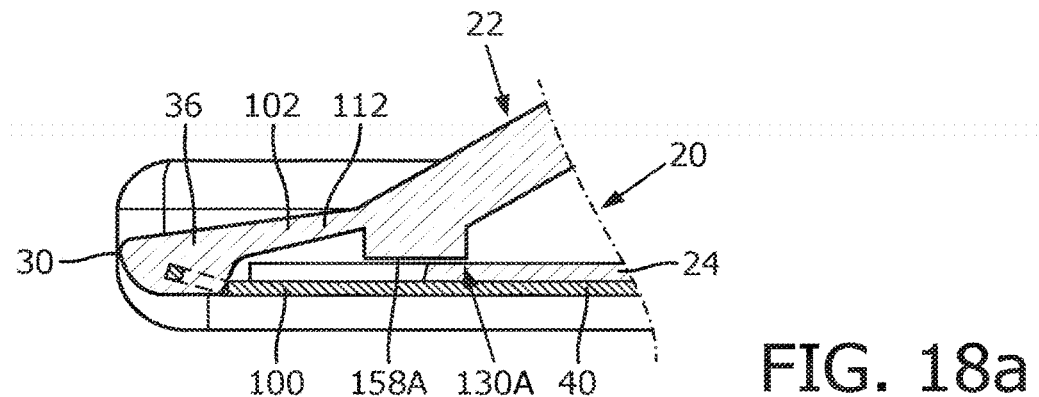
FIG. 18a shows a cross-sectional side view of an exemplary blade set in accordance with the present disclosure, at a toothed leading edge of the stationary blade thereof, the cross-section located at a tooth thereof.
Figure 18B:
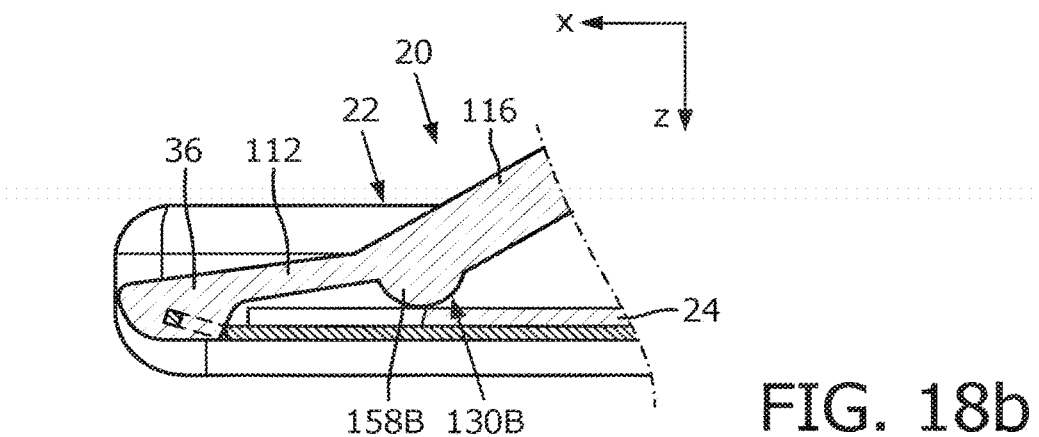
FIG. 18b shows a further cross-sectional side view of an exemplary blade set in accordance with the present disclosure, at a toothed leading edge of the stationary blade thereof, the cross-section located at a tooth thereof.
Figure 18C:
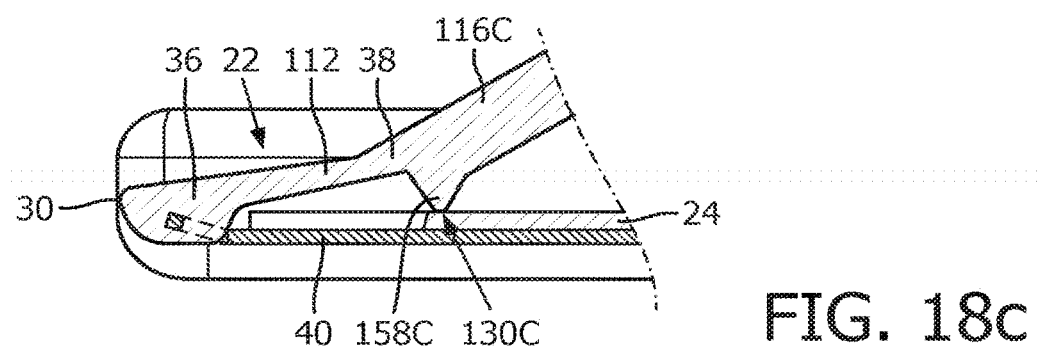
FIG. 18c shows yet another cross-sectional side view of an exemplary blade set in accordance with the present disclosure, at a toothed leading edge of the stationary blade thereof, the cross-section located at a tooth thereof.

With further reference to FIGS. 18a, 18b and 18c, exemplary embodiments of the protruding contact portion 130a and the contact element 158 will be illustrated and further detailed hereinafter. As already shown in FIGS. 15 and 16, the protruding contact portion 130a may be provided at a transition between the second leg 112 and the inclined portion 116 of the second wall portion 102. In FIGS. 15 and 16, the contact element 158a is basically arranged as an edge or intersection of the second leg 112 and the inclined portion 116 which is inwardly facing or protruding towards the metal component 40 as the first wall portion 100.

As can be seen from FIGS. 18a, 18b and 18c, the protruding contact portion 130a alternatively may be formed as an elevated or raised element at the second wall portion 102. As shown in FIG. 18a, the protruding contact portion 130a may have a substantially rectangular form, for instance. Generally, the protruding contact portion 130 may comprise a distinct contact element 158 shaped as a contact surface. The contact element 158a illustrated in FIG. 18a may be arranged substantially parallel to a bottom surface of the metal component 40 of the first wall portion 100. Basically, extensive surface contact between the planar or flat contact element 158 and the movable cutter blade 24 may be achieved.

FIGS. 18b and 18c illustrate that the protruding contact portion 130 may generally comprise a curved contact element 158 b, 158 c. The respective cross-sectional views of FIGS. 18b and 18c further illustrate that the contact elements 158 b, 158 c may basically comprise a semi-circular or rounded contact surface. While the protruding contact portion 130 b of FIG. 18b is generally formed as a circular segment, the protruding contact portion 130 c of FIG. 18c may be rather wedge-shaped including a rounded tip at which the contact element 158 for contacting the movable cutter blade 24 is arranged. With respect to the embodiments of the protruding contact portions 130 illustrated in FIGS. 15 and 18 a to 18 c, it should be further noted that their precise appearance and shape may be modified within relatively wide ranges. Particularly, the shape of the contact element 158 may be modified to influence the size of a resulting contact surface between the second wall portion 102 of the stationary blade 22 and the movable cutter blade 24. Furthermore, a longitudinal position (X-position) of the contact elements 158 with respect to the movable cutter blade 24 may be modified. However, at least in some embodiments, it is preferred that the contact spot between the second wall portion 102 and the movable cutter blade 24 is inwardly offset from a respective contact spot of the first wall portion 100 and the movable cutter blade 24, refer also to FIG. 17. Hence, also the movable cutter blade 24 may be pre-loaded or pre-bended in the guide slot 96 and, consequently, exhibiting a slightly convex overall shape.

It may be further beneficial that a basically pre-loaded assembly including the stationary blade 22 and the movable cutter blade 24 may act as an at least slightly tensioned biasing member. Given that the assembly structure of the resulting blade set 20 is at least partially at least slightly flexible, defined mounting conditions for the movable cutter blade 24 and defined operating conditions for the blade set may be provided. It should be mentioned in this regard that, however, the pre-loaded stationary blade of FIG. 16 and the pre-loaded movable cutter blade of FIG. 20 might also be combined, even though they are deformed in an opposite manner.

Figure 19:
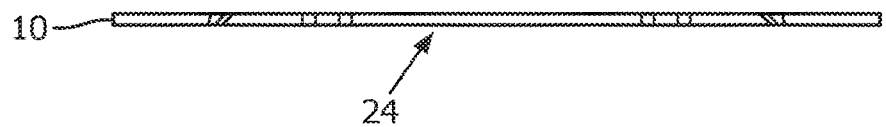
FIG. 19 shows a side view of a movable cutter blade which is configured to cooperate with a stationary blade in accordance with an embodiment of the present disclosure, the movable cutter blade shown in a basically planar state.
Figure 20:
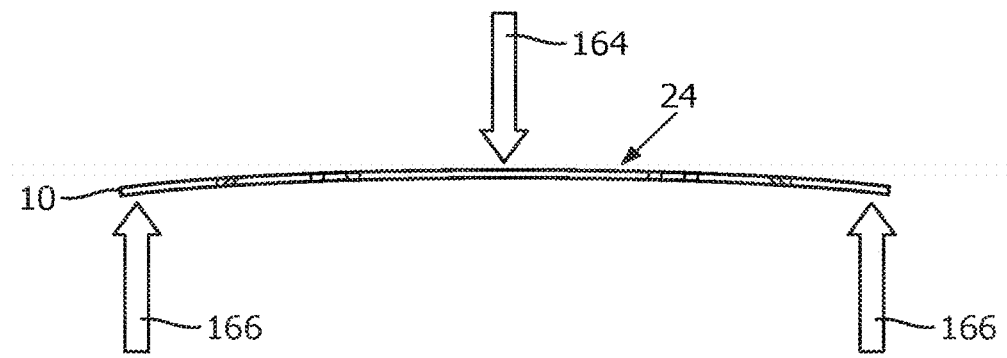
FIG. 20 shows yet another side view of a movable cutter blade, the movable cutter blade being shown in a slightly deformed state (exaggerated representation of the deformation)
Figure 21:
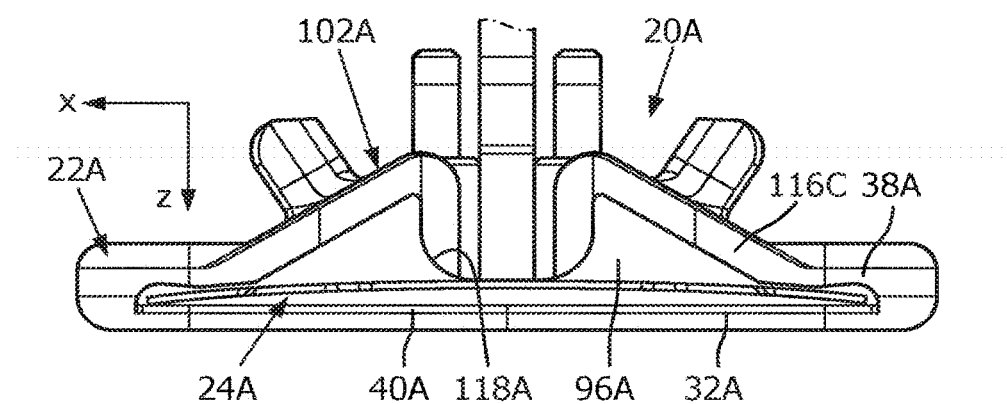
FIG. 21 is yet another side view of a blade set including a stationary blade and a movable cutter blade formed in accordance with the embodiment illustrated in FIG. 20, wherein a defined mating of the movable cutter blade at the stationary blade is provided.
Figure 22:
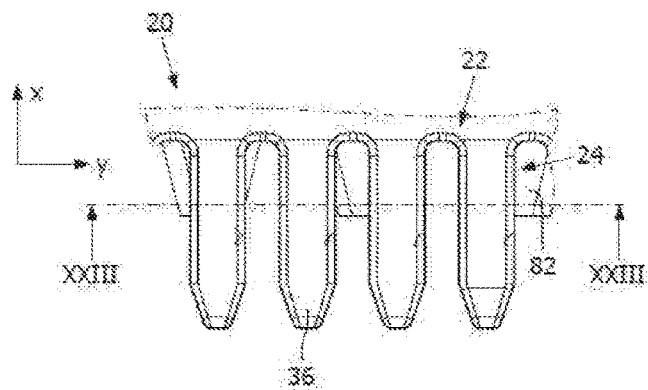
FIG. 22 is a partial bottom view of a blade set at a leading edge thereof, the blade set including a movable cutter blade and a stationary blade.

With particular reference to FIGS. 19, 20 and 21, an alternative approach to the implementation of a defined clearance mounting of the movable cutter blade 24 in the guide slot 96 of the stationary blade 22 is further described and illustrated. FIG. 19 illustrates a side view of a movable cutter blade 24 which comprises a basically planar shape. FIG. 20 illustrates a side view of a slightly pre-bended or pre-loaded movable cutter blade 24. FIG. 21 illustrates a further side view of a blade set 20 including a stationary blade 22 and a pre-loaded movable cutter blade 24 which is inserted into a respective guide slot 96 of the stationary blade 22. Given the arrangement illustrated in FIG. 21, the movable cutter blade 24 may comprise a basically concave or forwardly bended shape with respect to the top surface 32 of the metal component 40. This may basically involve that the movable cutter blade 24 is received at its bottom surface at the center portion 118a of the second wall portion 102. Therefore, also at the center portion 118a, a respective contact portion 130 may be provided. Consequently, a pre-loading force (block arrow indicated by reference numeral 164 in FIG. 20) may be applied to the movable cutter blade 24 in a central longitudinal portion thereof.

By contrast, at its top side, the movable cutter blade 24 may contact the metal component 40 in the region of its leading edges 80. Consequently, given the concave shape of the movable cutter blade 24 shown in FIG. 20, a respective contacting force or pre-loading force may be applied to the movable cutter blade 24 at two relatively distanced contact spots, refer to respective block arrows indicated by reference numeral 166. Also in this way a defined pre-loaded mounting condition for the movable cutter blade 24 may be achieved. It may be again preferred that at least the teeth 82 of the movable cutter blade 24 and the tooth stem portions 88 of the metal component 40 are brought into alignment and in basically extensive surface contact when the movable cutter blade 24 is mounted in the guide slot 96.

Figure 23:
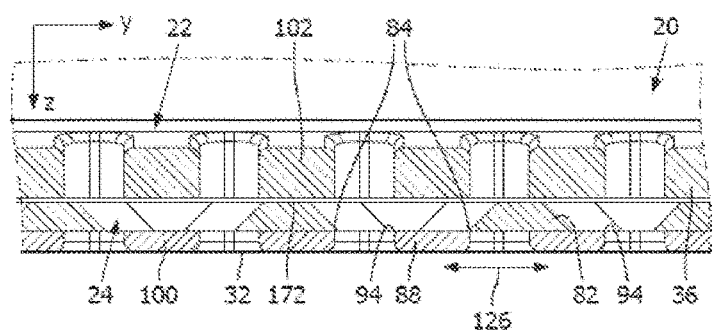
FIG. 23 is an enlarged cross-sectional frontal view of the blade set shown in FIG. 22 taken along the line XXIII-XXIII in FIG. 22.
Figure 24:
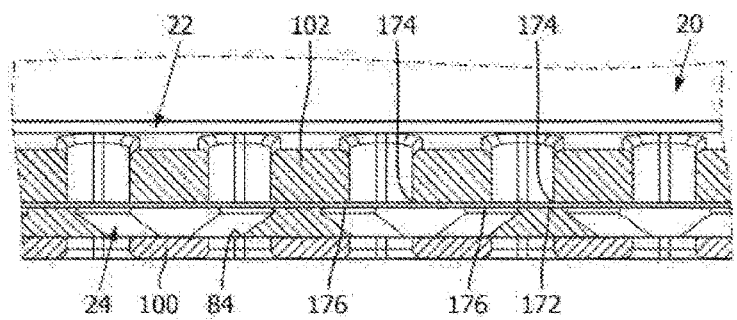
FIG. 24 is a further partial cross-sectional frontal view of a blade set including a stationary blade and a modified movable cutter blade shown in an orientation which basically corresponds to the view of FIG. 24.
Figure 25:
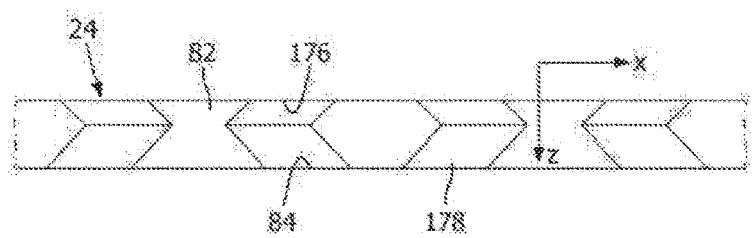
FIG. 25 is a partial frontal view of the movable cutter blade illustrated in FIG. 24.

With particular reference to FIGS. 22 to 25, exemplary embodiments of the teeth 82 of the movable cutter blade 24 are illustrated and further explained. FIG. 23 and FIG. 24 show respective partial cross-sectional front views of a blade set 20, wherein both the teeth 36 of the stationary blade 22 and the teeth 82 of the movable cutter blade 24 are cut, refer also to the line XXIII-XXIII in FIG. 22. The respective teeth 36 of the stationary blade 22 are sectionally formed by the plastic component 38, at the second wall portion 102, and the metal component 40, at the first wall portion 100. The movable cutter blade 24 is movably received and guided in a slot between the first wall portion 100 and the second wall portion 102. Relative reciprocating motion between the stationary blade 22 and the movable cutter blade 24 is indicated by a double-arrow designated by reference numeral 126 in FIG. 23. As can be further seen from FIG. 23, the teeth 36 and the teeth 82 may be provided with respective cutting edges 84, 94 that are configured to cooperate with each other to cut hairs that enter tooth gaps between the teeth 36 of the stationary blade 22. At the stationary blade, the cutting edges 94 may be provided at respective tooth stem portions 88. Consequently, the cutting edges 94 of the stationary blade 22 are provided at the metal component 40 forming at least a substantial part of the first wall portion 100. In the embodiment illustrated in FIG. 23, the movable cutter blade 24 correspondingly comprises cutting edges 84 at its top side facing the first wall portion 100. Consequently, the cutting edges 84, 94 may come into contact and cooperate with each other. As can be further seen from FIG. 23, the teeth 82 of the movable cutter blade 24 may comprise a basically trapezoid shape. Particularly, the cutting edges 84 are provided at acute angles of the trapezoid profile of the teeth 82. At the bottom side of the movable cutter blade 24, the trapezoid profile may basically comprise blunt angles.

The configuration exemplarily illustrated in FIG. 23 is particularly beneficial to cut hair very close to the skin. Since the second wall portion 102 of the stationary blade 22 basically strengthens or stiffens the stationary blade 22, the thickness of the first wall portion 100 may be significantly reduced resulting in a smoother shaving performance. Since it is particularly preferred that the movable cutter blade 24 is, at least at its teeth 82, in close contact with the metal component 40, particularly its tooth stem portions 88, a small remaining clearance gap 172 may be provided at the bottom side of the teeth 82 between the second wall portion 102 and the movable cutter blade 24. In some cases, hairs, particularly hair clippings, may enter the clearance gap 172. This might adversely influence friction between the movable cutter blade 24 and the stationary blade 22. Hairs may be stuck in the clearance gap 172 so that debris may be generated at the gap. Hence, the blade set 20 may become stalled. Furthermore, assuming that a considerable amount of hairs is jammed in the clearance gap 172, the power consumption of the hair cutting appliance 10 might be increased or, vice versa, the output power might be diminished. Consequently, shaving performance and durability of the hair cutting appliance might be reduced.

FIG. 24 illustrates an alternative embodiment of the blade set 20 wherein particularly the movable cutter blade 24 is modified with respect to the embodiment shown in FIG. 23. As can be seen from the cross-sectional front view in FIG. 24 and from the frontal view in FIG. 25, the movable cutter blade 24 according to this embodiment is provided with cutting edges 84 at the skin-facing side thereof that contacts the first wall portion 100. Further, the movable cutter blade 24 comprises rear cutting edges 176 at the bottom side thereof facing the second wall portion 102. Consequently, the teeth 82 of the movable cutter blade 24 may comprise a basically X-shaped cross-section. In other words, the teeth 82 of the movable cutter blade 24 may comprise lateral flanks 178 comprising a basically concave or notched shape. It is particularly preferred that the teeth 82 of the movable blade comprise a substantially polygonal shape wherein, at the top side thereof, two acute top angles and, at a bottom side thereof, two further acute top angles respectively define the (top) cutting edges 84 and the rear cutting edges 176. By way of example, a movable cutter blade 24 in accordance with the embodiment of FIG. 24 and FIG. 25 may be formed by an etching process. Etching processes or similar material-removing processes may form relatively complex shapes at metal materials. Etching the shape of the movable cutter blade 24 is particularly preferred since in this way a single process may be used to produce a near-net shape of the movable cutter blade 24. Further, the top cutting edges (84) that are configured to cooperate with cutting edges 94 at the first wall portion 100, and the rear (i.e., bottom) cutting edges 176, that bottom side, that are configured to cooperate with bottom cutting edges 174 at the second wall portion 102.

Figure 26:
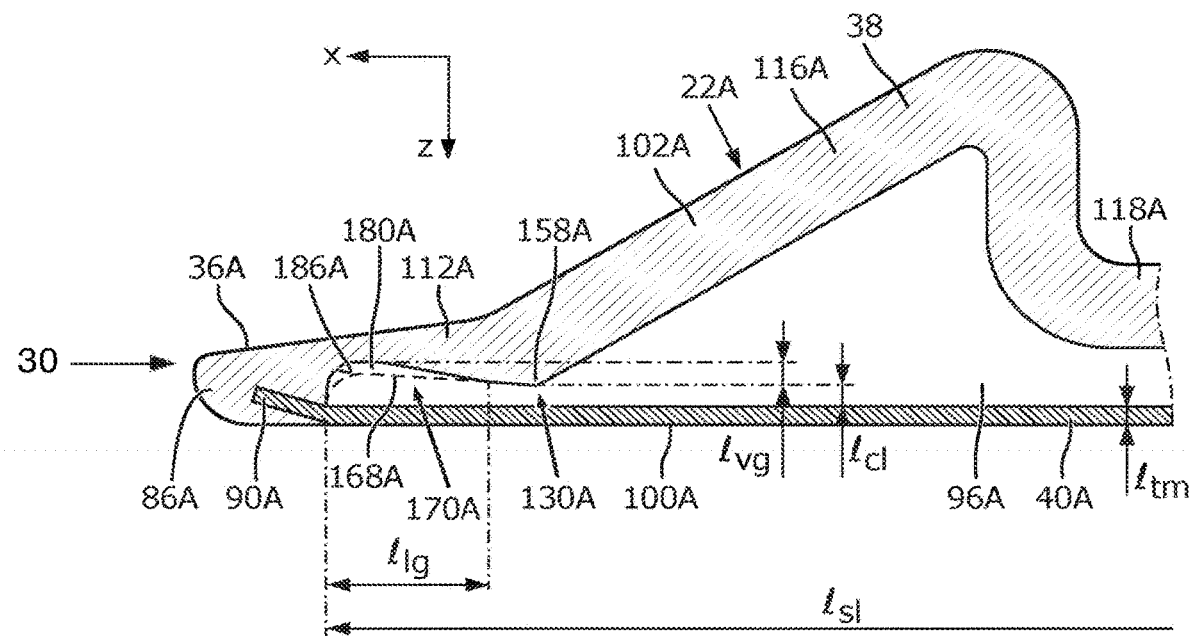
FIG. 26 is a partial cross-sectional side view of yet another embodiment of a stationary blade in accordance with the present disclosure through a respective tooth.
Figure 27:
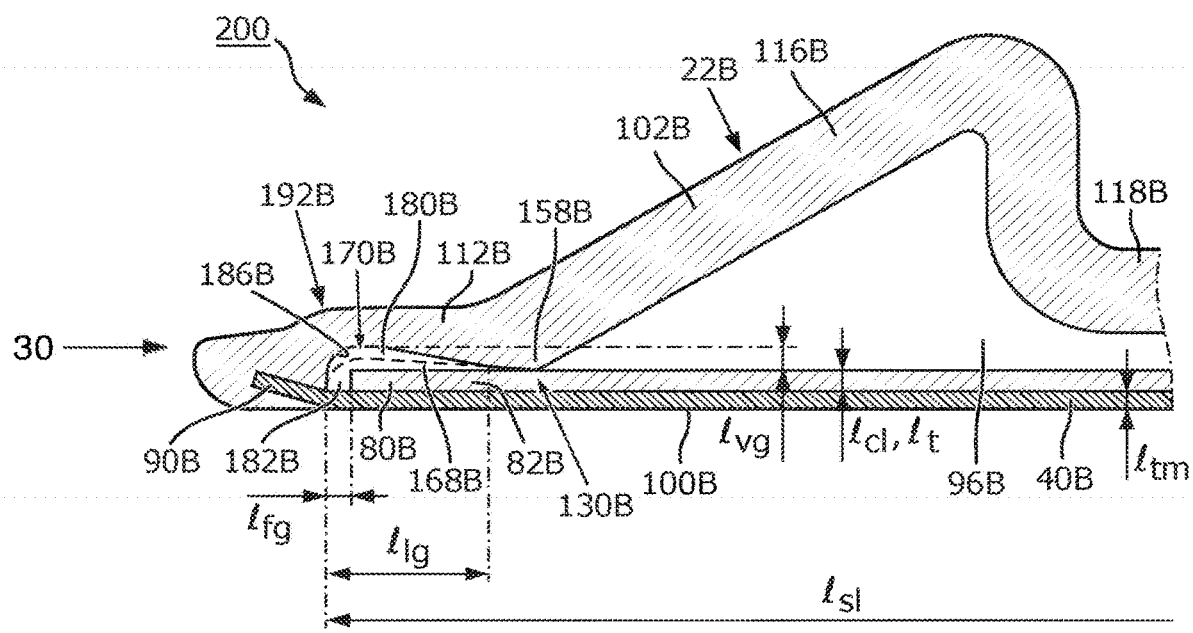
FIG. 27 is a partial cross-sectional side view of yet another embodiment of a blade set in accordance with the present disclosure through respective teeth of a stationary blade and a movable cutter blade thereof.

FIG. 26 illustrates another exemplary embodiment of a stationary blade 22 in accordance with at least some aspects of the present disclosure. FIG. 27 illustrates a blade set 200 implementing yet another exemplary embodiment of a stationary blade 22. Both FIG. 26 and FIG. 27 are partial cross-sectional views illustrating basically a half view of the stationary blades 22, refer also to FIGS. 6 and 14 in this connection. FIG. 26 shows a cross-section through a tooth 36 of the stationary blade 22. FIG. 27 shows a cross-section through a tooth 36 of the stationary blade 22 and through a tooth 82 of the movable cutter blade 24.

As can be seen from FIGS. 26 and 27, the stationary blades 22, particularly the plastic component 38 thereof, may comprise a recessed gap portions 170a, 170b at the guide slot 96. Particularly, the recessed gap portions 170a, 170b may be arranged as recessed gap portions 170a, 170b recessed with respect to a standard shape 168a, 168b of an exemplary guide slot, refer to the dashed lines in FIGS. 26 and 27 denoted by reference numeral 168a, 168b, and to FIG. 7, for instance.

The recessed gap portion 170b may provide a height offset from the movable cutter blade 24 (refer to FIG. 27) or, similarly, from the protruding contact portion 130 involving a vertical (rear) gap extension $l_{vg}$ in the range of about 50 to about 250 μm (micrometer), for instance. More preferably, the vertical gap extension $l_{vg}$ may be in the range of about 100 to 200 μm, more preferably in the range of about 120 to 180 μm. Alternatively, or in addition, with reference to FIG. 27, the recessed gap portion 170b may provide a longitudinal offset from the movable cutter blade 24 or, similarly, from the protruding contact portion 130 involving a longitudinal or frontal gap extension $l_{fg}$ in the range of about 50 to about 250 μm (micrometer), for instance. More preferably, the frontal gap extension $l_{fg}$ may be in the range of about 100 to 200 μm, more preferably in the range of about 120 to 180 μm. The gap portion may further comprise on overall longitudinal gap extension $l_{lg}$ in the range of about 0.5 to about 1.5 mm (millimeter), more preferably in the range of about 0.7 to about 1.1 mm. The overall longitudinal gap extension $l_{lg}$ may extend from the protruding contact portion 130, particularly from a contact element 158 thereof, to a frontal longitudinal end of the guide slot 96 adjacent to the tips 86 of the teeth 36.

Generally, the guide slot 96 may comprise an overall longitudinal extension $l_{sl}$ in the range of about 7.0 mm to about 11.0 mm, more preferably in the range of about 8.0 mm to about 10.0 mm. Generally, a ratio between the overall longitudinal gap extension $l_{lg}$ (at one toothed leading edge 30) and the overall longitudinal extension hi may be in the range of about 1:6 to about 1:12, more preferably in the range of about 1:8 to about 1:11. As already indicated above, the guide slot 96 may provide a vertical clearance height dimension $l_{cl}$ which is adapted to vertical thickness dimension $l_t$ of the movable cutter blade 24. The vertical clearance height dimension $l_{cl}$ and the vertical thickness dimension $l_t$ may be in the range of about 0.1 mm to about 0.2 mm, preferably in the range of about 0.12 mm to about 0.17 mm.

The recessed gap portion 170b may define a bottom gap or rear gap 180b at a bottom side of the guide slot 96. The recessed gap portion 170b may further define a frontal gap or nose gap 182b at a frontal end of the guide slot 96. The rear gap 180b and the nose gap 182b may merge into one another. The recessed gap portion 170b may comprise an inclined flank 184 and a curved transition 186b adjacent to the inclined flank 184. The inclined flank 184 and the curved transition 186b may merge into one another. The inclined flank 184 and the curved transition 186b may be shaped in a concave manner. The inclined flank 184 and the curved transition 186b may commonly form an internal indentation at the guide slot 96. The inclined flank 184 and the curved transition 186 may be substantially arranged at the second wall portion 102, particularly at the second leg 112 thereof. The inclined flank 184 and the curved transition 186 may be formed from the plastic component 38.

As can be best seen in FIG. 27, a bulge 192 may be provided at the second wall portion 102, particularly at the second leg 112 b thereof. The bulge 192 may be arranged as a protrusion at a bottom side of the second wall portion 102 that is generally facing away from the skin when the blade set 20 is in operation. The bulge 192 may strengthen the second wall portion 102 in the vicinity of the gap portion 170. Generally, the bulge 192 may comprise an external surface that may substantially correspond to an internal surface of the gap portion 170. The bulge 192 may be shaped in a convex manner. Due to the bulge 192, the second wall portion 102, particularly the second leg 112 thereof, may maintain its general wall thickness.

Figure 28:
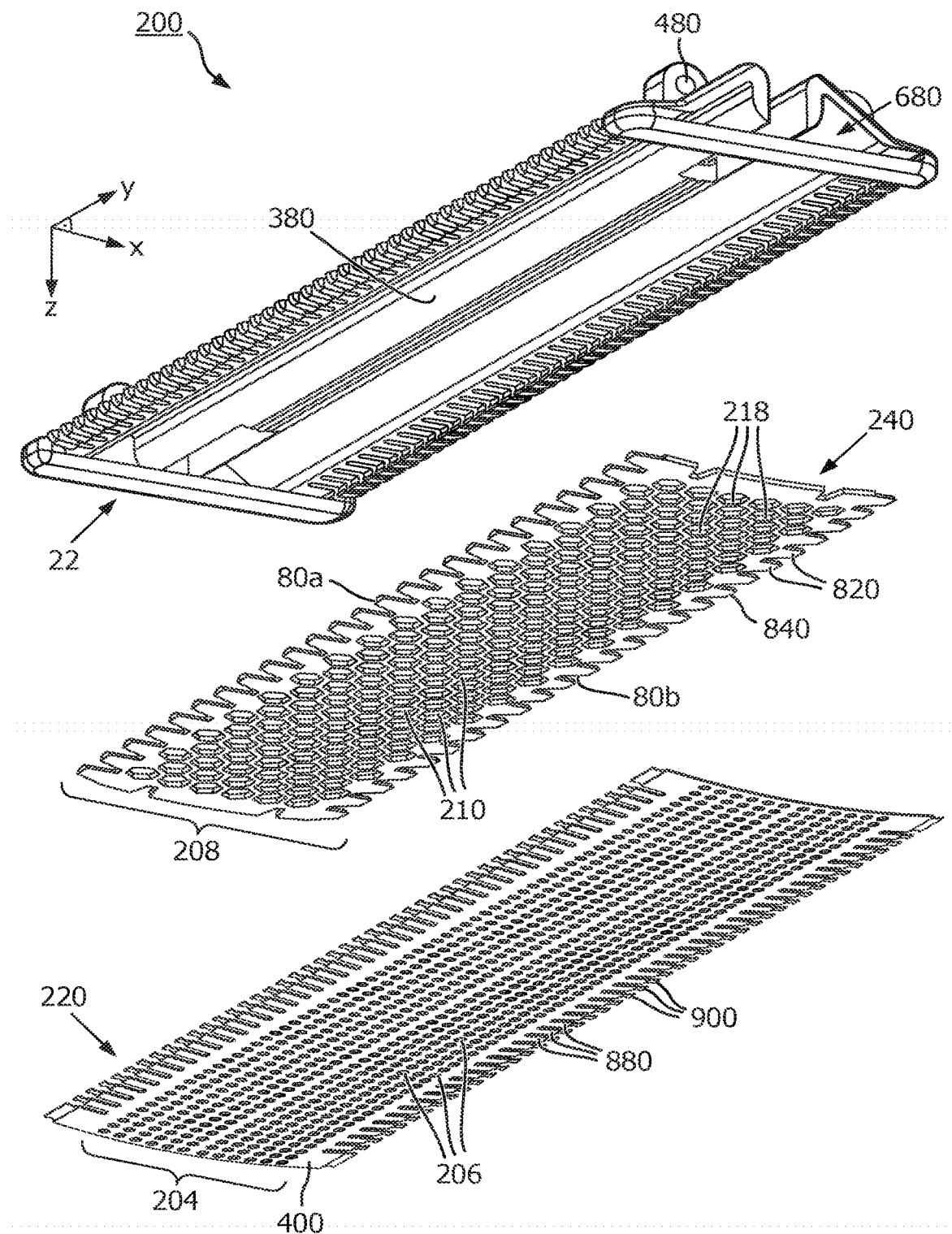
FIG. 28 is an exploded perspective top view of an alternative embodiment of a blade set in accordance with at least some aspects of the present disclosure.
Figure 29:
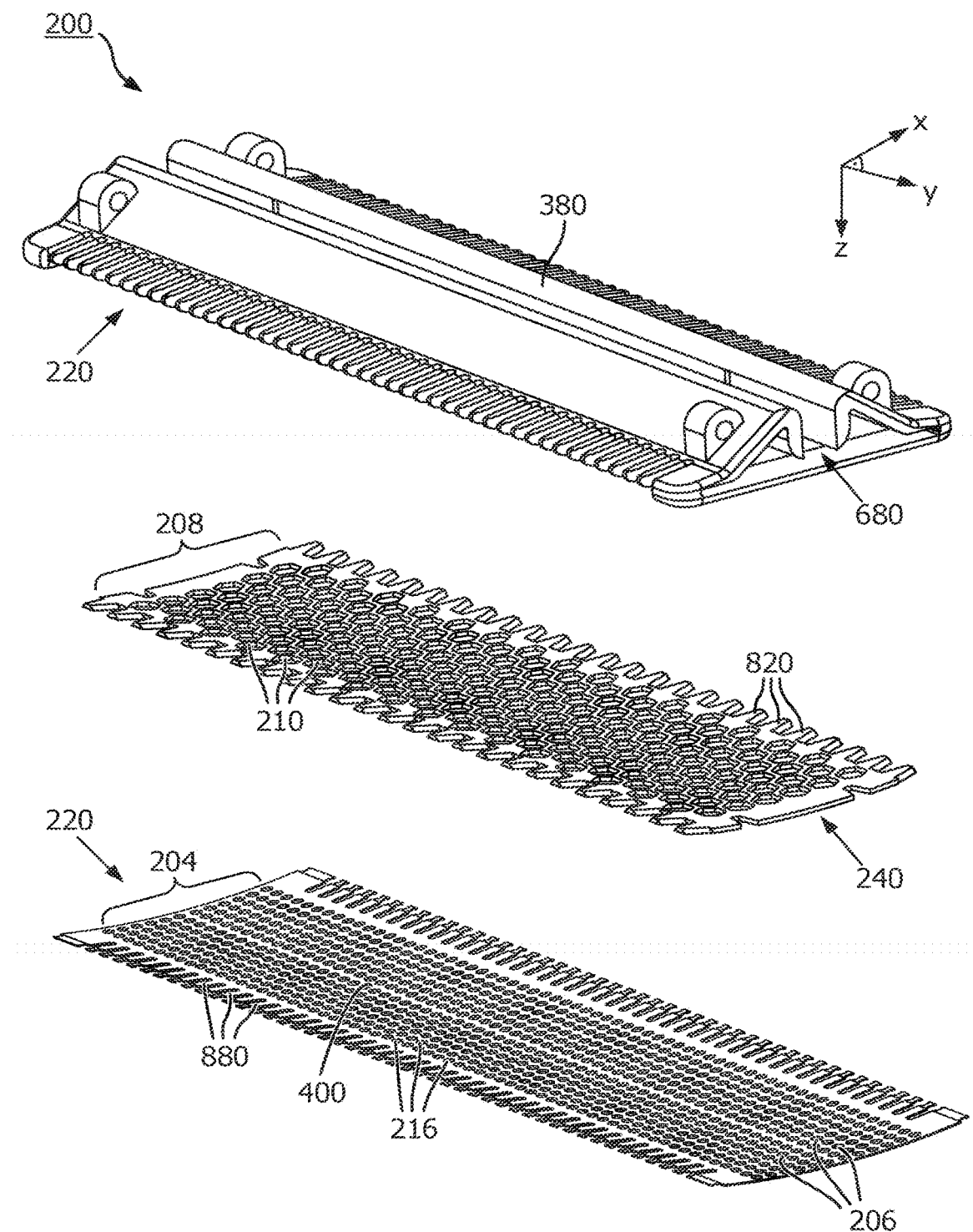
FIG. 29 is an exploded perspective top view of the blade set as shown in FIG. 28.

A further beneficial aspect of the present disclosure will be described and elucidated in the following in connection with FIGS. 28 to 38. In accordance with this alternative aspect, different cutting regions that are suited for at least slightly different purposes are implemented in the blade set. In FIGS. 28 to 38, the respective blade sets are designated by reference numeral 200. As already explained hereinbefore, also the blade set 200 can be regarded as a metal-plastic composite blade set. However, it is explicitly mentioned in this connection that the blade set 200 that implements a plurality of differently shaped cutting sections may be formed in accordance with alternative manufacturing principles as well. As shown in FIGS. 28 and 29, the blade set 200 comprises a stationary blade 22 and a movable cutter blade 24. Preferably, the blade set 200 consists of the stationary blade 22 and the movable cutter blade 24. This may of course involve that a transmitting member is provided that is coupled to the movable cutter blade 24, refer in this connection to FIG. 3, for instance. However, it is preferred that, apart from that, the blade set 200 does not necessarily comprise further components.

As with the embodiment of the blade set 20 as shown in FIG. 3, also the stationary blade 22 of the blade set 200 shown in FIGS. 28 and 29 comprises a plastic component 38 and a metal component 40 that are bonded to each other. Hence, the plastic component 38 may be formed and molded to the metal component 40 in an injection molding process. Consequently, the blade set 200 may be referred to as insert molding blade set 200, overmolding blade set 200, etc. Further, as already explained above, since the stationary blade 22 may be referred-to as metal-plastic composite stationary blade 22, particularly as integrally molded or shaped stationary blade 22, in practice, the plastic component 38 is not present in isolation in these embodiments.

Figure 30:
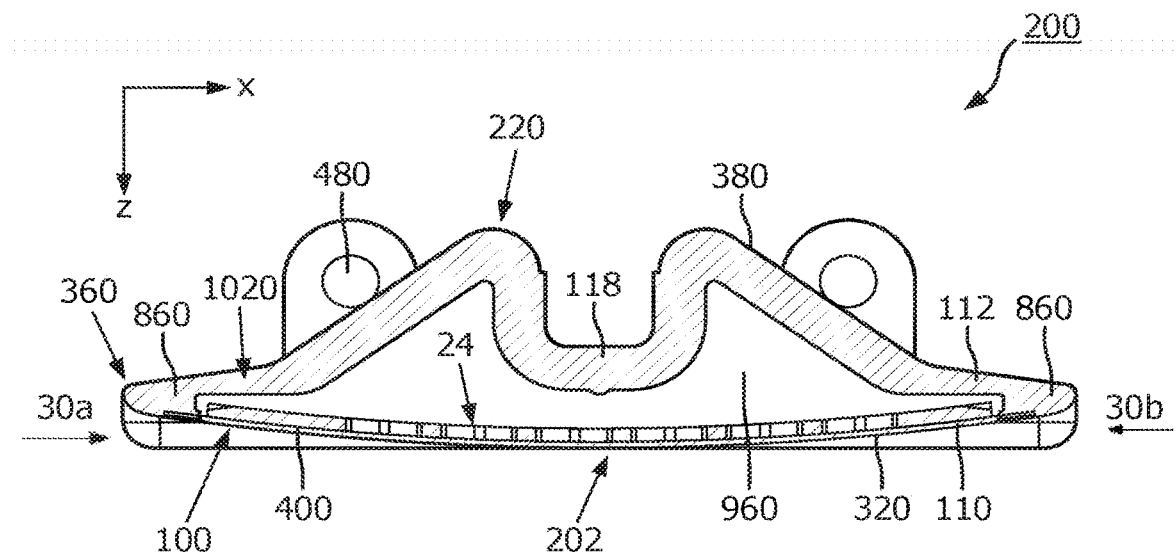
FIG. 30 is a cross-sectional lateral side view of the blade set as shown in FIGS. 28 and 29.

As already shown hereinbefore, the stationary blade 220 comprises a first wall portion 1000 and a second wall portion 1020, refer also to FIG. 30. The first wall portion 1000, at least a substantial portion thereof, is formed by the metal component 400. As with the embodiment of FIGS. 28 to 30, the second wall portion 1020 is formed by the plastic component 380 which also forms at least a minor part or fraction of the first wall portion 1000. The first wall portion 1000 and the second wall portion 1020 jointly define a guide slot 96 in which the movable cutter blade 24 may be slidingly received. Further, at a lateral end of the blade set 200, a lateral opening 68 may be provided through which the movable cutter blade 240 may be inserted. In the mounted state of the movable cutter blade 24, a respective transmitting member 70 may be attached thereto and lock or secure the movable cutter blade 24 at the stationary blade 220 of the blade set 200. Refer also to FIG. 3.

Figure 31:
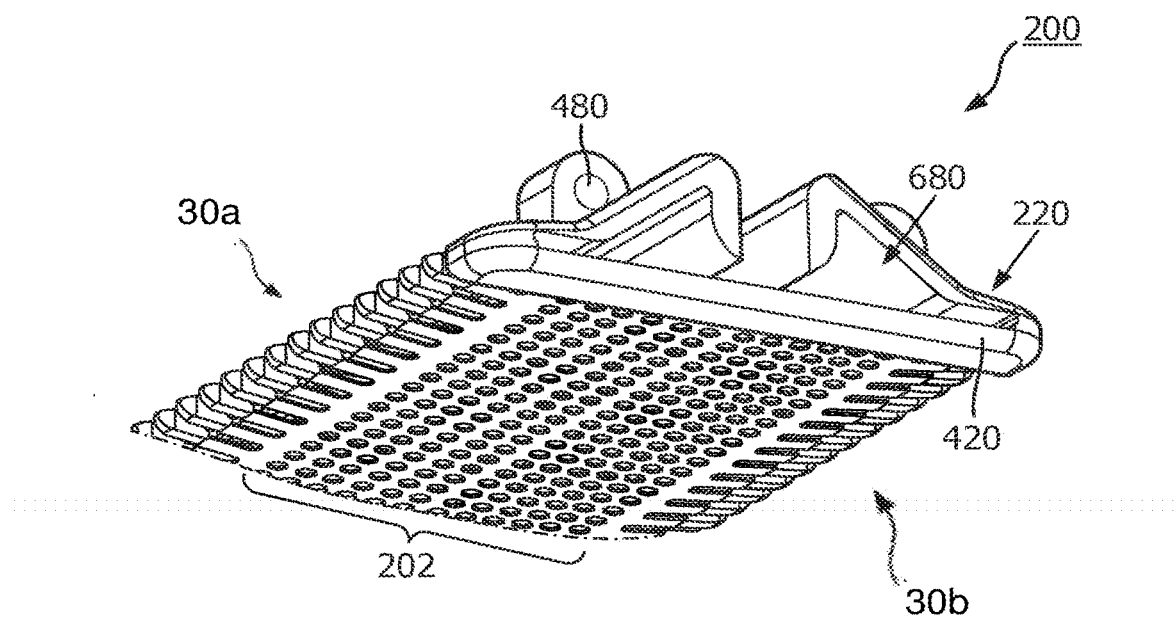
FIG. 31 is a partial perspective top view of the blade set as shown in FIGS. 28 and 29.

In the assembled and mounted state, a foil shaving region 202 is provided at the blade set 200, refer to FIG. 31. The foil shaving region 202 is arranged and located adjacent to the at least one of the first and second leading edges 30a, 30b. Preferably, as with the double-sided blade set 200 of FIG. 31 that implements a first leading edge 30a and a second leading edge 30b that is offset from the first leading edge 30a, the foil shaving region 202 is arranged between the first leading edge 30a and the second toothed edge 30b. However, the two considerably distinct types of cutting zones or cutting regions 202 are basically defined by the same components of the blade set 200.

By way of example, the metal component 40 from which the first wall portion 100 is at least substantially formed, may be provided with respective tooth stem portions 88 which, in the molded or overmolded state, form the teeth 36 of the stationary blade 22 in cooperation with the plastic component 38. To this end, anchoring elements 90 may be provided at longitudinal ends of the tooth stem portions 88 to which the molded and liquefied plastic material may be bonded in the course of injection molding or forming the plastic component 38. Further, a perforated section 204 may be provided at the metal component 40 and may be therefore also present at the first wall portion 100. The perforated section 204 is arranged between respective laterally extending series of longitudinally extending tooth stem portions 88. The perforated section 204 comprises a series or pattern of perforations 206, particularly of circularly-shaped cutouts. At the side thereof that is facing away from the skin, when in operation, which is also referred-to as bottom side, the perforations 206 may be at least partially provided with cutting edges 216.

The arrangement or pattern of perforations 206 the perforated section 204 is provided with may comprise an arrangement including a defined number of lines and a defined number of columns of respective perforations 206. However, also other types or forms of patterns of perforations may be provided, for instance a staggered pattern of perforations 206.

At the movable cutter blade 24, a corresponding perforated section 208 may be provided that comprises a plurality of perforations 210. The perforated section 208 is arranged and located between a first toothed leading edge 80 a and a second toothed leading edge 80 b of the movable cutter blade 24. Each of the first and second toothed leading edge 80 a, 80 b extends in the lateral direction Y and is provided with basically longitudinally extending teeth 82 that are provided with respective cutting edges 84. As can be best seen from FIGS. 28 and 29, the perforated section 208 illustrated therein comprises a pattern of perforations 210, which are hexagonal and staggered. In other words, the perforations 210 may be arranged in a honeycomb-like fashion. Hence, neighboring rows and columns of the pattern of the perforated section 208 as shown in FIGS. 28 and 29 may be arranged in an offset or incremented fashion, wherein an offset dimension between neighboring rows and columns may amount to approximately half the distance of neighboring perforations 210 within that particular row or column. Other types and shapes of respective patterns may be of course envisaged.

Respective cutting edges of the perforations 210 that are arranged as honeycomb-like perforations and that form the perforated section 208 as shown in the perspective exploded top view of FIG. 28 are indicated by reference numeral 218. Corresponding cutting edges that are formed at the perforations 206 of the metal component 40 at the side thereof that is facing away from the skin (bottom side) are indicated in FIG. 29 by reference numeral 216.

Figure 32:
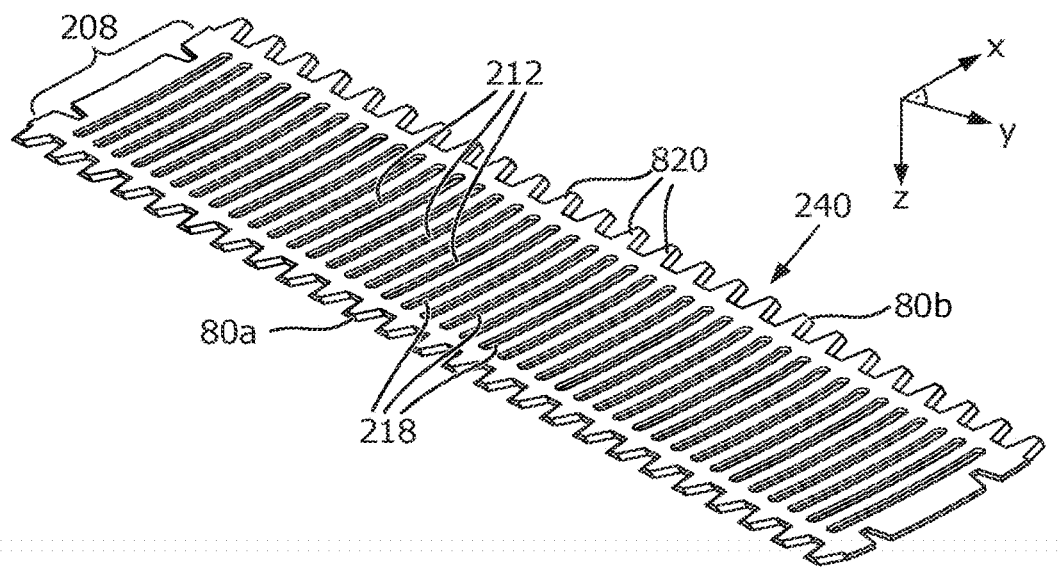
FIG. 32 is a perspective bottom view of an alternative arrangement of a movable cutter blade for the blade set as shown in FIGS. 28 to 31.
Figure 33:
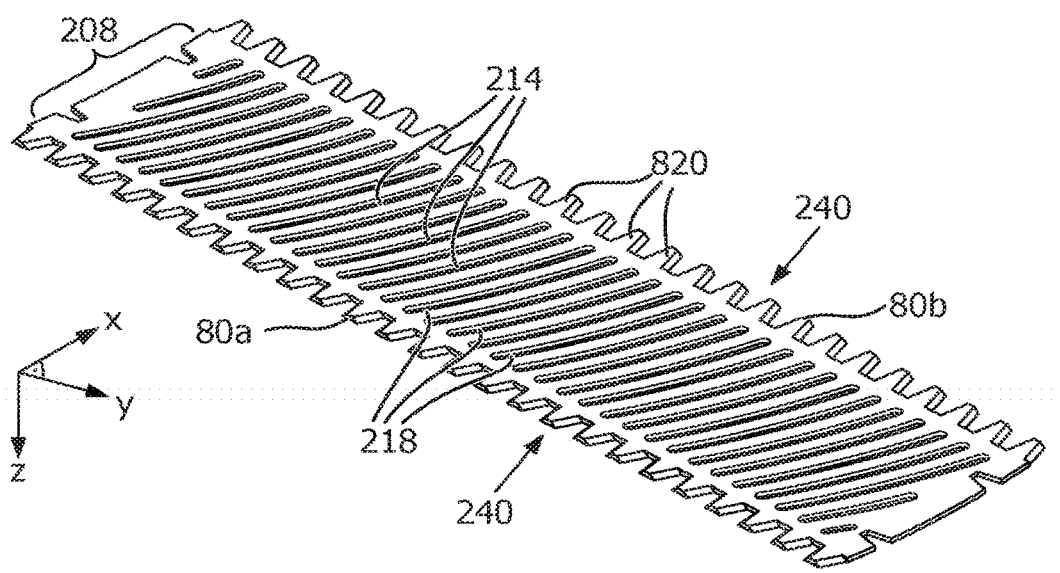
FIG. 33 is a perspective bottom view of another alternative embodiment of a movable cutter blade for the blade set as shown in FIGS. 28 to 31.

Alternative embodiments of movable cutter blades 24 that also implement perforated sections 208 to define a foil shaving region 202 are shown in FIGS. 32 and 33. For instance, the perforated section 208 of the movable cutter blade 24 of FIG. 32 includes a series of basically longitudinally extending perforations 212. Preferably, the perforations 212 are comprised with respective cutting edges 218 at the top side (skin-facing side) thereof, at least along their longitudinal extension X. An alternative arrangement of slot-like or slant perforations 214 the perforated section 208 may be formed of is shown in FIG. 33. The respective movable cutter blade 24 includes a pattern of slant perforations 214 that are arranged as slots having a main extension that is at least slightly inclined with respect to the longitudinal direction X. As with the embodiment of FIG. 32, also the slant perforations 214 of FIG. 33 may comprise respective cutting edges 218 at the skin-facing top side thereof.

Relatively short and stiff hairs that enter the perforations 206 of the first wall portion 100 that is at least substantially defined by the metal component 40 may be cut in a shearing cutting operation upon relative movement of the movable cutter blade 24 and the stationary blade 22. Hence, not only at the respective first and second leading edges 30a, 30b but also at the foil shaving region 202, hairs may be cut very close or even at the level of the skin, refer also to FIG. 30. As can be seen in FIGS. 28 to 33, the metal component 40 and the movable cutter blade 24 are at least slightly curved along their extension in the longitudinal direction X. So as to further improve the cutting performance of the blade set 200, it is desired to bring the movable cutter blade 24 and the stationary blade 22 into a tight surface contact in the mounted state.

Assuming that the movable cutter blade 24, particularly the skin-facing side thereof, and the first wall portion 100, particularly the side thereof that is facing away from the skin, may be at least slightly biased against one another and therefore contact each other in an areal fashion, both the foil shaving region 202 in the center portion and the respective peripheral cutting regions that are arranged at opposite longitudinal ends of the blade set 200 may contribute to the cutting action. By way of example, the cutting region that is primarily defined by the teeth of the movable cutter blade 24 and the corresponding teeth of the stationary blade 22 that are present at the respective first and second leading edges 30 a, 30 b may be referred-to as trimming or shearing region.

Adjacent to or, more explicitly, between the first and second leading edges 30 a, 30 b, the foil shaving region 202 may be provided.

Figure 34:
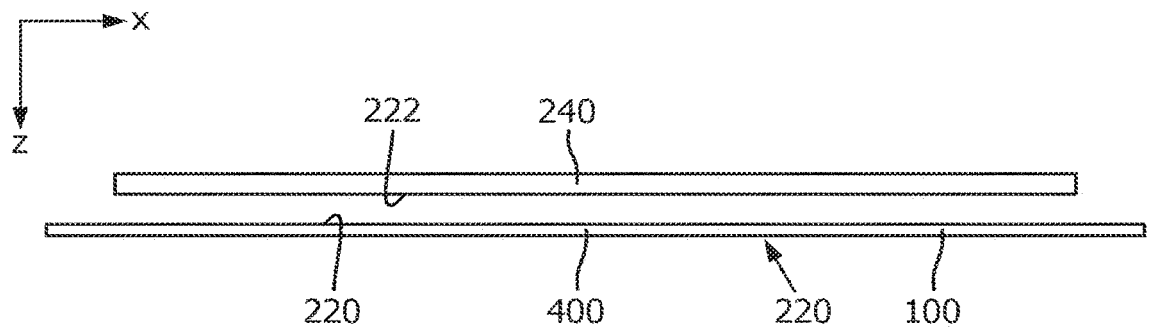
FIG. 34 is a simplified schematic lateral side view of a movable cutter blade and a metal component for a first wall portion of a stationary blade of a blade set, wherein the movable cutter blade and the metal component are shown in a planar state.

With particular reference to FIGS. 34 to 38, beneficial refinements and embodiments of components of the blade set 200 will be further detailed and explained. Primarily for illustrative purposes, FIG. 34 shows a schematic simplified lateral side view of a movable cutter blade 24 and a first wall portion 100, particularly a metal component 40, of a stationary blade 22, each of which basically extending in a relatively flat and planar fashion. In other words, stationary blade 220 and cutting surface 222 at the first wall portion 100 and at the movable cutter blade 24, respectively, that may be perforated in accordance with the embodiment of FIGS. 28 to 31, may cooperate with each other to cut hairs therebetween. However, due to basically inevitable manufacturing tolerances, inaccuracies, etc., it may be advantageous in at least some embodiments to define and form the movable cutter blade 24 and the metal component 40 of the stationary blade in a defined curved fashion and to urge them into contact with each other in the finally mounted state so as to achieve the desired surface contact at the respective contact surfaces of stationary blade 220, and cutting surface 222.

Figure 35:
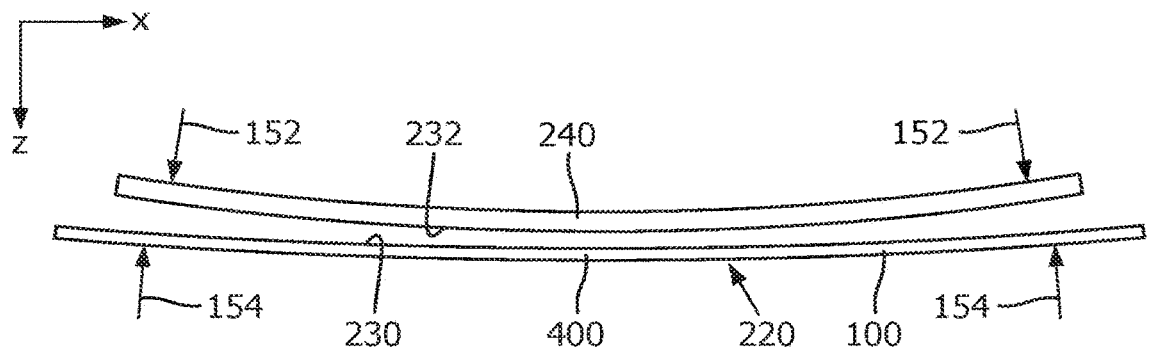
FIG. 35 is a further simplified schematic lateral side view of a movable cutter blade and a metal component for a first wall portion of a stationary blade, wherein the movable cutter blade and the metal component are curved along their longitudinal extension.
Figure 36:
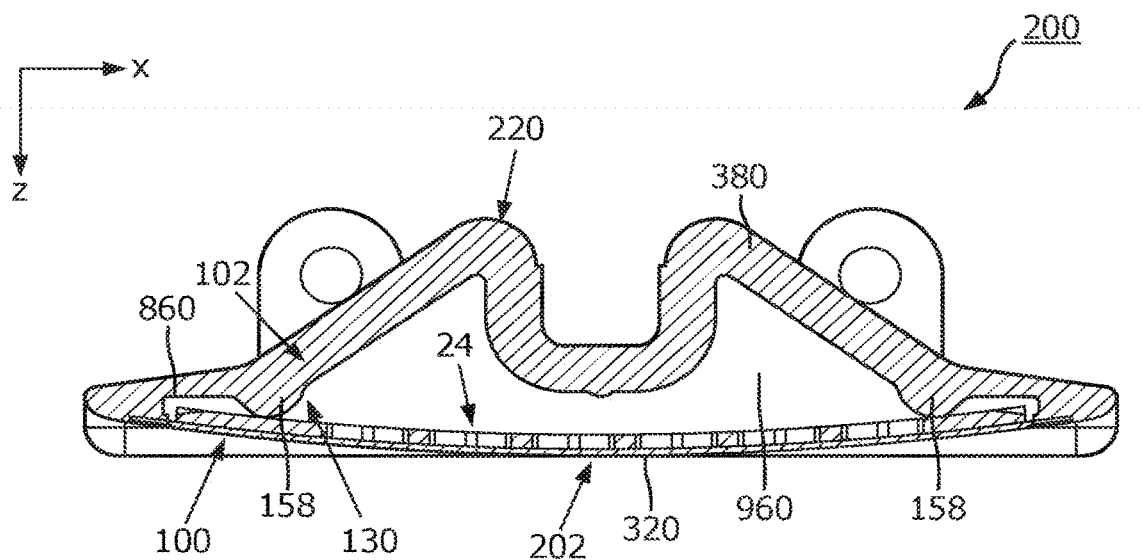
FIG. 36 is a cross-sectional lateral side view of a further alternative embodiment of a blade set, wherein the blade set implements the movable cutter blade and the metal component as shown in FIG. 35, wherein the movable cutter blade and the metal component are biased into a surface contact.
Figure 37:
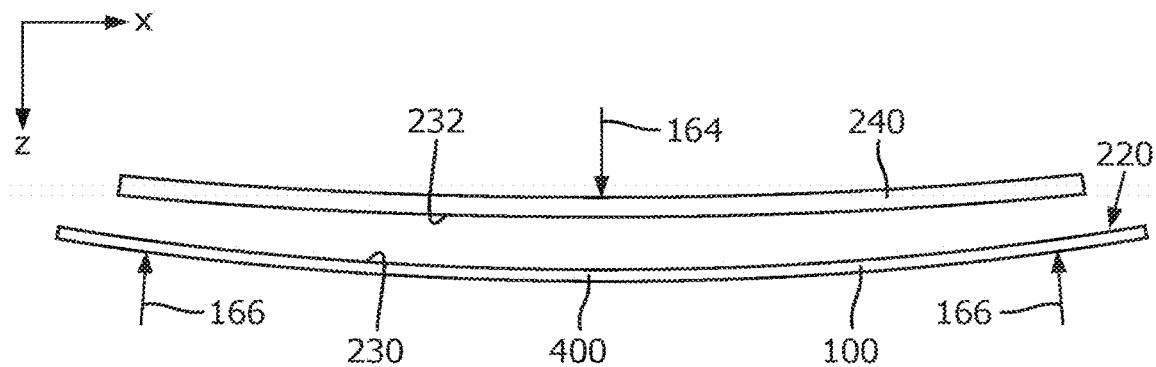
FIG. 37 is another simplified schematic lateral side view of a movable cutter blade and a metal component for a first wall portion of a stationary blade, wherein the movable cutter blade and the metal component are curved along their longitudinal extension.

Exemplary embodiments in connection with this approach are shown in FIGS. 35 to 38. FIG. 35 and FIG. 37 illustrate schematic simplified lateral side views of movable cutter blades 24 and metal components 40 for the first wall portion 100 of the stationary blade 22. Both in FIG. 35 and in FIG. 37, the movable cutter blade 24 and the metal component 40 may be formed from pre-bended sheet metal material. Further, the respective movable cutter blade 24 and the respective metal components 40 may comprise a basically convexly curved section or outline. A respective curvature of a curved surface 232 at the movable cutter blade 24 and a curvature of a corresponding curved surface 230 of the metal component 40 may be at least slightly different from each other in an initial state. The curved surface 230 corresponds to the stationary blade 220. The curved surface 232 corresponds to the cutting surface 222. Refer also to FIG. 34.

Figure 38:
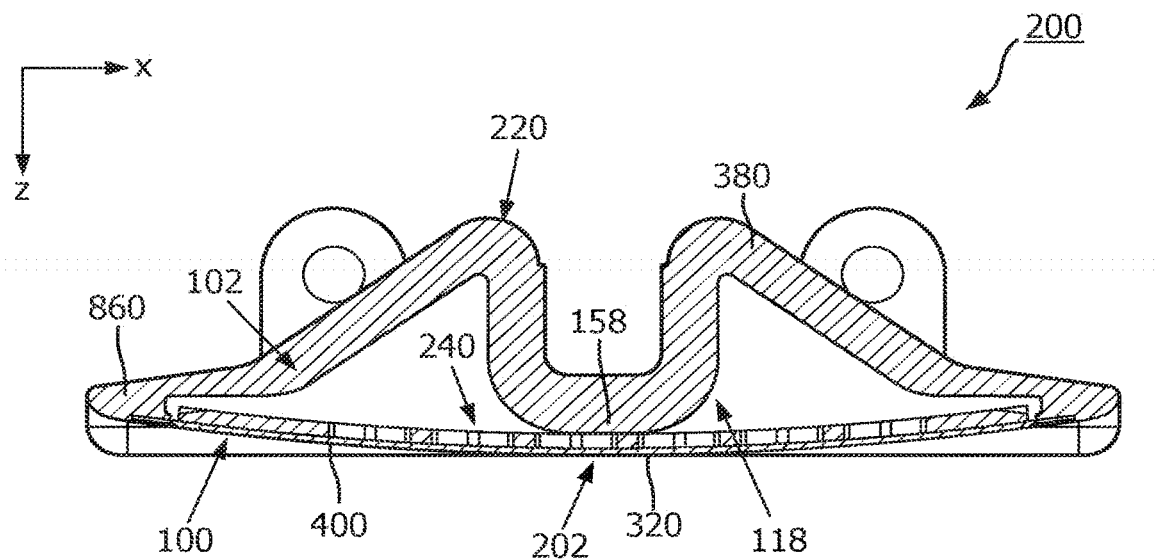
FIG. 38 is a cross-sectional lateral side view of another alternative embodiment of a blade set, wherein the blade set implements the movable cutter blade and the metal component as shown in FIG. 35, wherein the movable cutter blade and the metal component are biased into a surface contact.

As can be seen in FIG. 35, a radius of curvature of the curved surface 232 is smaller than a radius of curvature of the curved surface 230. By contrast, as can be seen in FIG. 37, the radius of curvature of the curved surface 232 is larger or greater than the radius of curvature of the curved surface 230. This may have the advantage that, upon a defined exertion of load to the movable cutter blade 24 and to the metal component 40, same may be biased and urged into a surface contact in the finally mounted state as shown in the respective cross-sectional side views of FIGS. 36 and 38. FIG. 36 illustrates an assembled or mounted state of an embodiment of the blade set 200 that implements a movable cutter blade 240 and, at the stationary blade 220 thereof, a metal component 400 as illustrated in FIG. 35. FIG. 38 illustrates a cross-sectional lateral side view of an embodiment of a blade set 200 that implements a movable cutter blade 240 and, at the stationary blade 220, a metal component 400 as illustrated in FIG. 37.

As already indicated above, the plastic component 38 of the stationary blade 22 may be provided with at least one protruding contact surface 130 that may urge the movable cutter blade 24 into an areal contact with the first wall portion 100. As already discussed hereinbefore, also a shrinkage-related distortion of the plastic component 38 may be utilized so as to urge or pull the metal component 40 that forms at least a substantial portion of the first wall portion 100 into contact with the movable cutter blade 24. For the avoidance of repetitions, reference is made to FIGS. 13 to 21 and to the corresponding description section in this context. Accordingly, the shape and the manufacturing process for the plastic component 38 may be arranged such that, in the mounted state, opposite contact forces 152, 154 can be applied to the metal component and to the movable cutter blade 24, refer to FIG. 35. Preferably, respective pairs of the contact force 152, 154 are offset from each other in the longitudinal direction so as to ensure that the differently curved plastic component 38 and movable cutter blade 24 can be urged into close surface contact.

The embodiment as illustrated in FIG. 35 and FIG. 36 is suitable for a configuration of the movable cutter blade 24 and the metal component 40 wherein in an initial state a gap is provided adjacent to the longitudinal ends thereof. By urging the movable cutter blade 24 and the metal component 40 into contact with each other at the longitudinal ends, the gap can be closed.

By contrast, as with the embodiment of FIG. 37 and FIG. 38, in an initial state, a central gap may be present due to the different curvature of the movable cutter blade 24 and the metal component 40. Consequently, by applying a central contact force 164, the central gap can be closed so that the movable cutter blade 24 and the metal component may be urged into surface contact. At the skin-facing side or top surface 32, an opposite contact force 166 may be applied to the metal component 40 which may be transferred via the tips 86 where the first wall portion 100 and the second wall portion 102 are connected. Consequently, two arrows denoting the contact force 166 as indicated in FIG. 37 adjacent to longitudinal ends of the metal component 40 illustrate the resulting counterforce. The central contact force 164 and the opposite contact force(s) 166 may urge the movable cutter blade 24 and the metal component 40 against one another so as to "close" the central gap therebetween and to bring the respective curved surfaces 230, 232 into an areal contact.

Figure 39:
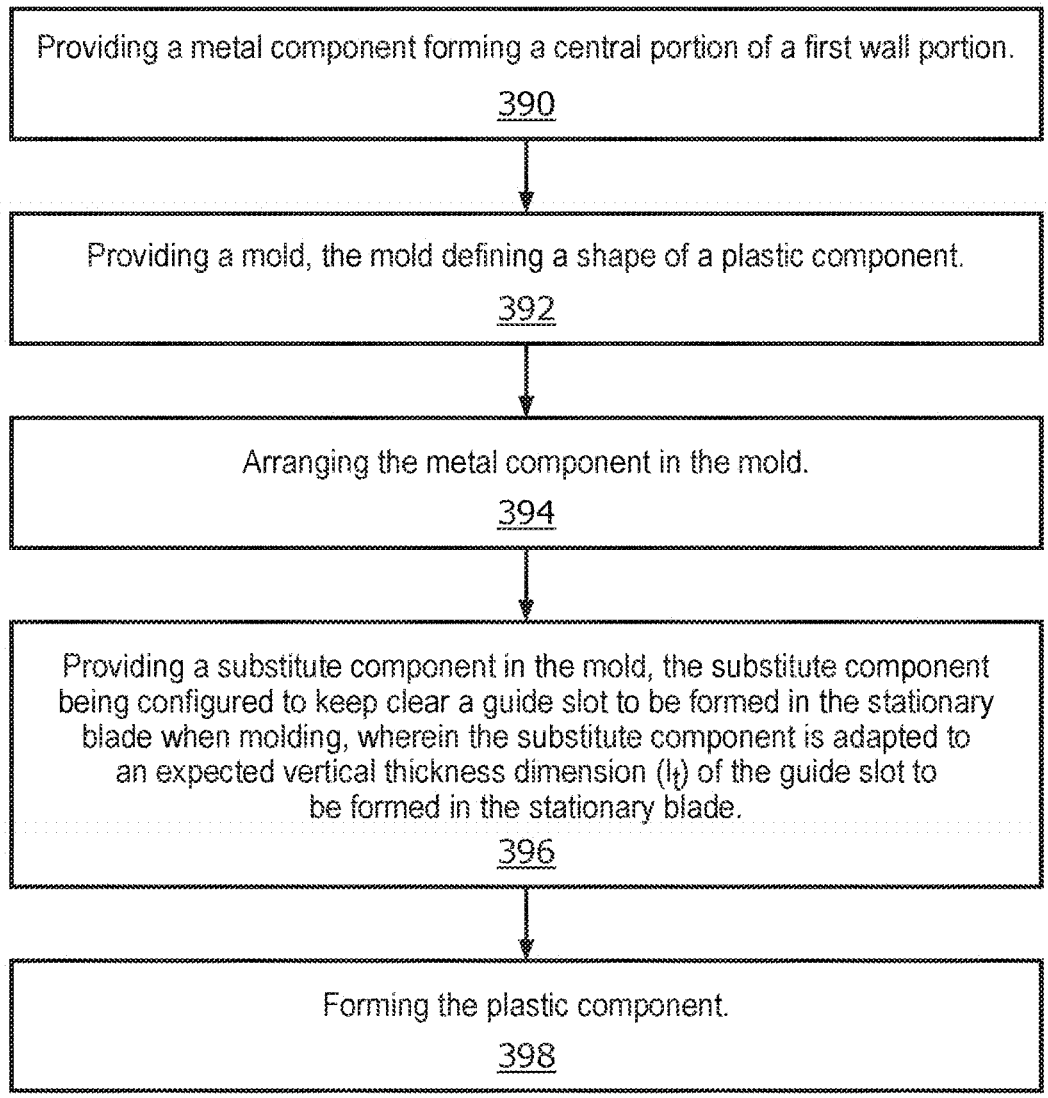
FIG. 39 is a flow diagram to illustrate a method of manufacturing a metal-plastic composite stationary blade of a blade set for a hair cutting appliance.

FIG. 39 is a flow diagram to illustrate a method of manufacturing a metal-plastic composite stationary blade of a blade set for a hair cutting appliance.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A stationary blade for a blade set of a hair cutting appliance, the blade set being arranged to be moved through hair in a moving direction to cut the hair, the stationary blade comprising:
a first wall portion arranged to serve as a skin facing wall when in operation,
a second wall portion at least partially offset from the first wall portion, such that the first wall portion and the second wall portion define therebetween a guide slot arranged to receive a movable cutter blade,
wherein the stationary blade is an integrally formed metal-plastic composite stationary blade including a metal component and a plastic component,
the stationary blade further comprising:
at least one toothed leading edge comprising a plurality of teeth, the plurality of teeth jointly formed by the first wall portion and the second wall portion,
wherein the plurality of teeth are formed by the metal component,
wherein the at least one toothed leading edge includes a rounded tip formed by the plastic component,
wherein the plurality of teeth of the at least one toothed leading edge further comprise a plurality of tooth stem portions provided with respective cutting edges, the respective cutting edges configured to cooperate with respective cutting edges of teeth of the movable cutter blade, the plurality of tooth-stem portions being formed by the metal components,
wherein the at least one toothed leading edge further includes a plurality of anchoring elements, each anchoring element being arranged at a longitudinal end of a corresponding one of the tooth stem portions,
wherein each of the plurality of anchoring elements is provided with a recess portion,
wherein each of the plurality of anchoring elements is covered by a plastic material of the plastic component,
wherein the first wall portion is jointly formed of the plastic component and the metal component,
wherein a portion of the first wall portion is formed by the metal component including the at least one toothed leading edge,
wherein the first wall portion comprises, at respective tooth portions, bonding portions where the plastic component is bonded to the metal component,
wherein the first wall portion and the second wall portion are arranged to receive the movable cutter blade in the guide slot in a defined mating manner, and
wherein the stationary blade further comprises mounting protrusions integrally formed with the plastic component at the second wall portion to enable attachment to and release from a linkage mechanism.

2. The stationary blade as claimed in claim 1, wherein the metal component of the stationary blade is a sheet metal insert, and wherein at least a central portion of the first wall portion is formed by the metal component.

3. The stationary blade as claimed in claim 1, wherein the first wall portion and the second wall portion enable a defined pre-stressed fit mating of the movable cutter blade in the guide slot of the stationary blade.

4. The stationary blade as claimed in claim 1, wherein the second wall portion comprises at least one protruding contact portion facing the first wall portion, wherein the at least one protruding contact portion is configured to contact a bottom surface of the movable cutter blade.

5. The stationary blade as claimed in claim 4, wherein the at least one protruding contact portion is configured to urge the movable cutter blade against the first wall portion of the stationary blade.

6. The stationary blade as claimed in claim 4, wherein the plurality of teeth of the at least one toothed leading edge comprise, when viewed in a cross-sectional plane perpendicular to a lateral direction (Y) associated with a length of the stationary blade, a U-shaped form comprising a first leg at the first wall portion and a second leg at the second wall portion, wherein the first leg and the second leg merge into one another at the rounded tip of the at least one toothed leading edge, and wherein the second wall portion comprises an inclined portion adjacent to the second leg, wherein the at least one protruding contact portion is arranged at a transition between the second leg and the inclined portion.

7. The stationary blade as claimed in claim 4, further comprising a gap portion formed at the guide slot in the vicinity of the at least one toothed leading edge, adjacent to the at least one protruding contact portion, wherein the gap portion comprises at least one of a rear gap at the second wall portion and a nose gap at a transition between the first wall portion and the second wall portion, wherein the gap portion is an at least a partially concavely shaped internal indentation, wherein the gap portion is arranged to provide a remaining gap ($l_{vg}$, $l_{fg}$) between the guide slot and a toothed leading edge of the movable cutter blade mountable in the guide slot, and wherein the gap portion is adapted to accommodate cut hair sections.

8. The stationary blade as claimed in claim 1, wherein the first wall portion is a rigid wall portion and wherein the second wall portion is a flexible wall portion, wherein at least a central portion of the first wall portion is made from a material comprising a modulus of elasticity that is greater than a modulus of elasticity of a material at least a central portion of the second wall portion is made from.

9. The stationary blade as claimed in claim 1, wherein the first wall portion further comprises a perforated section in which a plurality of perforations is provided, and wherein the perforations at least partially comprise cutting edges at a side of the first wall portion that is facing away from skin of a user.

10. The stationary blade as claimed in claim 9, wherein the cutting edges of the perforations of the first wall portion are arranged to cooperate with corresponding cutting edges that are provided at the movable cutter blade in a shearing action upon relative motion between the stationary blade and the movable cutter blade.

11. The stationary blade as claimed in claim 9, wherein the perforated section of the first wall portion comprises a pattern of perforations that are arranged as circular holes.

12. A blade set for a hair cutting appliance, said blade set being arranged to be moved through hair in a moving direction to cut the hair, said blade set comprising:
a movable cutter blade, and
a stationary blade,
the stationary blade being integrally formed as a metal-plastic composite stationary blade including a metal component and a plastic component, the stationary blade comprising:
a first wall portion jointly formed of the plastic component and the metal component, and the first wall portion arranged to serve as a skin facing wall when in operation,
a second wall portion formed of the plastic component and at least partially offset from the first wall portion, such that the first wall portion and the second wall portion define therebetween a guide slot arranged to receive the movable cutter blade,
at least one toothed leading edge formed by the metal component of the stationary blade and comprising a plurality of teeth jointly formed by the first wall portion and the second wall portion,
wherein the plurality of teeth of the at least one toothed leading edge comprise tooth-stem portions provided with cutting edges, the cutting edges of the tooth-stem portions configured to cooperate with respective cutting edges of teeth of the movable cutter blade,
wherein the first wall portion comprises, at respective tooth portions, bonding portions where the plastic component of the first wall portion is bonded to the metal component,
wherein the first wall portion and the second wall portion are arranged to receive the movable cutter blade in the guide slot in a defined mating manner such that the movable cutter blade, when mounted in the guide slot, provides a defined clearance dimension, wherein the movable cutter blade, when inserted into the guide slot, is not biased by a biasing element, and
wherein the stationary blade further comprises mounting protrusions arranged at the plastic component of the second wall portion and integrally formed with the plastic component of the first wall portion to enable attachment to and release from a linkage element of the appliance,
the movable cutter blade comprising:
at least one toothed leading edge, the movable cutter blade being movably arranged within the guide slot defined by the stationary blade, such that, upon relative motion of the movable cutter blade with respect to the stationary blade, the at least one toothed leading edge of the movable cutter blade cooperates with a corresponding one of said plurality of teeth of the stationary blade to enable cutting of hair caught between the at least one toothed leading edge of the movable cutting blade and the corresponding one of said plurality of teeth of the stationary blade in a cutting action;
wherein the movable cutter blade directly contacts, at a skin-facing side thereof, the first wall portion of the stationary blade and, at a side facing away from the skin, at least one protruding contact portion of the second wall portion, of the stationary blade.

13. The blade set as claimed in claim 12, wherein the movable cutter blade is bent when viewed in a cross-sectional plane perpendicular to a lateral direction (Y) associated with a length of the stationary blade, such that the movable cutter blade is received in the guide slot in a vertically preloaded and flexed fashion.

14. The blade set as claimed in claim 12, wherein the movable cutter blade comprises a perforated section that is adapted to a perforated section of the stationary blade, wherein a plurality of perforations is provided at the perforated section of the movable cutter blade, and wherein the plurality of perforations of the movable cutter blade at least partially comprise cutting edges at the skin-facing side of the movable cutter blade.

15. The blade set as claimed in claim 14, wherein the plurality of perforations of the movable cutter blade comprises a pattern of perforations, wherein the pattern of perforations includes at least one perforation shaped as a honeycomb hole, a circular hole, a longitudinally extending slot, or a slanting slot.

16. The blade set as claimed in claim 14, wherein an areal surface contact is provided between the perforated section of the movable cutter blade and the perforated section of the stationary blade.

17. The blade set as claimed in claim 12, wherein, when viewed in a cross-sectional plane perpendicular to a lateral direction (Y) associated with a length of the stationary blade, the first wall portion of the stationary blade and the movable cutter blade are convexly curved, and wherein the first wall portion of the stationary blade and the movable cutter blade are, in unbiased states, differently curved.

18. The blade set as claimed in claim 17, wherein, in unbiased states of the first wall portion and the movable cutter blade, a curvature of the metal component of the first wall portion is different from a curvature of the movable cutter blade, and wherein the movable cutter blade and the first wall portion are biased against one another such that the movable cutter blade and the first wall portion contact each other in an areal fashion.

19. A method of manufacturing a metal-plastic composite stationary blade of a blade set for a hair cutting appliance, the blade set comprising said stationary blade and a movable cutter blade, the method comprising:
providing a metal component forming a central portion of a first wall portion,
providing a mold, the mold defining a shape of a plastic component,
arranging the metal component in the mold,
providing a substitute component in the mold, the substitute component being configured to keep clear a guide slot to be formed in the stationary blade when molding, wherein the substitute component is adapted to an expected vertical thickness dimension of the guide slot to be formed in the stationary blade,
forming the plastic component,
wherein the plastic component and the metal component define the first wall portion and a second wall portion of the stationary blade, the first wall portion being arranged to serve as a skin facing wall when in operation, the second wall portion being at least partially offset from the first wall portion, such that the first wall portion and the second wall portion define therebetween the guide slot for the movable cutter blade, and
removing the substitute component from the metal-plastic composite stationary blade,
wherein the first wall portion and the second wall portion jointly form at least one toothed leading edge comprising a plurality of teeth, and
wherein the first wall portion is jointly formed of the plastic component and the metal component with a portion of the first wall portion being formed by the metal component including the at least one toothed leading edge,
wherein the first wall portion comprises, at respective tooth portions, bonding portions where the plastic component is bonded to the metal component,
wherein the at least one toothed leading edge includes a rounded tip formed by the plastic component,
wherein the at least one toothed leading edge further includes the metal component comprising a plurality of tooth stem portions, the tooth stem portions provided with respective cutting edges, the respective cutting edges configured to cooperate with respective cutting edges of teeth of the movable cutter blade, and
wherein the at least one toothed leading edge further includes a plurality of anchoring elements, each anchoring element being arranged at a longitudinal end of a corresponding one of the tooth stem portions, each of the plurality of anchoring elements being provided with recess portions, and each of the plurality of anchoring elements being covered by a plastic material of the plastic component.

20. The method as claimed in claim 19, further comprising the step of:
processing the metal component including forming a perforated section comprising a plurality of perforations at a central region of the metal component so as to define a foil shaving region.

* * * * *